United States Patent
Ohwatari et al.

(10) Patent No.: US 9,924,467 B2
(45) Date of Patent: Mar. 20, 2018

(54) BASE STATION

(71) Applicant: NTT DOCOMO, INC., Tokyo (JP)

(72) Inventors: Yusuke Ohwatari, Tokyo (JP); Kazuaki Takeda, Tokyo (JP); Yousuke Sano, Tokyo (JP); Yukihiko Okumura, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/123,314

(22) PCT Filed: Feb. 19, 2015

(86) PCT No.: PCT/JP2015/054683
§ 371 (c)(1),
(2) Date: Sep. 2, 2016

(87) PCT Pub. No.: WO2015/151635
PCT Pub. Date: Oct. 8, 2015

(65) Prior Publication Data
US 2017/0078973 A1    Mar. 16, 2017

(30) Foreign Application Priority Data
Apr. 1, 2014  (JP) .................. 2014-075631

(51) Int. Cl.
H04W 52/14 (2009.01)
H04W 52/32 (2009.01)
(Continued)

(52) U.S. Cl.
CPC .......... H04W 52/143 (2013.01); H04L 5/005 (2013.01); H04L 27/2602 (2013.01);
(Continued)

(58) Field of Classification Search
CPC . H04L 27/2626; H04L 5/005; H04L 27/2602; H04W 52/322
See application file for complete search history.

(56) References Cited

U.S. PATENT DOCUMENTS

2008/0254819 A1  10/2008  Niwano et al.
2010/0220808 A1   9/2010  Kishigami et al.
2014/0050279 A1   2/2014  Kishiyama

FOREIGN PATENT DOCUMENTS

CN    101237259 A    8/2008
CN    101502029 A    8/2009
(Continued)

OTHER PUBLICATIONS

International Search Report issued in PCT/JP2015/054683 dated Apr. 28, 2015 (2 pages).
(Continued)

Primary Examiner — Gbemileke J Onamuti
(74) Attorney, Agent, or Firm — Osha Liang LLP

(57) ABSTRACT

Some OFDM symbols transmitted temporally continuously by a base station include data signals that are not orthogonal to each other and are directed to user devices. A reference signal is arranged in the OFDM symbols temporally intermittently. The base station determines, according to reception qualities at user devices, downlink data signal transmission powers for transmitting downlink data signals. The base station reduces a downlink data signal transmission power in an OFDM symbol in which the reference signal is arranged to be lower than a downlink data signal transmission power in an OFDM symbol in which the reference signal is not arranged. The base station determines a downlink reference signal transmission power to be higher than the downlink data signal transmission power of a data signal in the OFDM symbol in which the reference signal is not arranged.

14 Claims, 8 Drawing Sheets

(51) Int. Cl.
*H04L 27/26* (2006.01)
*H04L 5/00* (2006.01)

(52) U.S. Cl.
CPC ....... *H04L 27/2626* (2013.01); *H04W 52/322* (2013.01); *H04W 52/325* (2013.01)

(56) References Cited

FOREIGN PATENT DOCUMENTS

| | | |
|---|---|---|
| CN | 103518339 A | 1/2014 |
| JP | 2008-160822 A | 7/2008 |
| JP | 2008-172377 A | 7/2008 |
| JP | 2009-218706 A | 9/2009 |
| JP | 2011-151471 A | 8/2011 |
| JP | 2013-009288 A | 1/2013 |
| JP | 2013-009291 A | 1/2013 |
| JP | 2013-034112 A | 2/2013 |
| JP | 2013-078096 A | 4/2013 |
| JP | 2013-179587 A | 9/2013 |
| WO | 2007/034552 A1 | 3/2007 |

OTHER PUBLICATIONS

Written Opinion of the International Searching Authority issued in PCT/JP2015/054683 dated Apr. 28, 2015 (4 pages).

3GPP TS 36.212 V12.0.0; "3rd Generation Partnership Project; Technical Specification Group Radio Access Network; Evolved Universal Terrestrial Radio Access (E-UTRA); Multiplexing and channel coding (Release 12)"; Dec. 2013 (88 pages).

3GPP TS 36.331 V11.0.0; "3rd Generation Partnership Project; Technical Specification Group Radio Access Network; Evolved Universal Terrestrial Radio Access (E-UTRA); Radio Resource Control (RCC); Protocol specification (Release 11)"; Jun. 2012 (302 pages).

Office Action issued in the counterpart Japanese Patent Application No. 2014-075631, dated Oct. 3, 2017 (6 pages).

Office Action issued in corresponding Chinese Patent Application No. 201580015110.8, dated Nov. 28, 2017 (18 pages).

BASE STATION

CROSS-REFERENCE TO RELATED APPLICATIONS

The present application is a national stage application of PCT Application No. PCT/JP2015/054683, filed on Feb. 19, 2015, which claims priority to Japanese Patent Application No. 2014-075631 filed on Apr. 1, 2014. The contents of the priority applications are incorporated by reference in their entirety.

TECHNICAL FIELD

The present invention relates to a base station in a radio communication system.

BACKGROUND ART

Orthogonal multiple access, in which signals do not interfere with each other, is widely used for communication between a base station and user devices (mobile stations, for example) in mobile communication networks. In orthogonal multiple access, different radio resources are allocated to different user devices. Examples of orthogonal multiple access are code division multiple access (CDMA), time division multiple access (TDMA), and orthogonal frequency-division multiple access (OFDMA). For example, in Long Term Evolution (LTE), which has been standardized by the 3GPP, OFDMA is used in downlink communication. In OFDMA, different frequencies are allocated to different user devices.

In recent years, non-orthogonal multiple access (NOMA) has been proposed as a communication scheme between a base station and user devices (see Patent Document 1, for example). In non-orthogonal multiple access, the same radio resource is allocated to different user devices. More specifically, a single frequency is simultaneously allocated to different user devices. When non-orthogonal multiple access is applied to downlink communication, a base station transmits a signal at high transmission power to a user device having a large path-loss, i.e., a user device having a low received signal-to-interference-plus-noise-power ratio (SINR) (generally a user device located at the edge of a cell area). In contrast, a base station transmits a signal at low transmission power to a user device having a small path-loss, i.e., a user device having a high received SINR (generally a user device located at the center of a cell area). As a result, there is interference between a signal received by one user device and a signal directed to another user device.

In such a case, each user device demodulates the signal directed to the user device using power difference. More specifically, the user device first demodulates a signal with the highest reception power. Since the demodulated signal is directed to a user device located nearest to the edge of a cell area, or a user device with the lowest received SINR, the user device located nearest to the edge of a cell area, or the user device with the lowest received SINR ends demodulation since the demodulated signal is directed to the user device located nearest to the edge of a cell area, or the user device with the lowest received SINR. Each of the other user devices removes from the received signal an interference component corresponding to the demodulated signal using an interference canceller, and then demodulates a signal with the second highest reception power. Since the demodulated signal is directed to a user device located second nearest to the edge of the cell area, or a user device with the second lowest received SINR, the user device located second nearest to the edge of the cell area, or the user device with the second lowest received SINR ends demodulation since the demodulated signal is directed to the user device located second nearest to the edge of the cell area, or the user device with the second lowest received SINR. By repeating the demodulation and the removal of a signal with high power in this way, every user device is able to demodulate a signal directed to the user device.

By combining non-orthogonal multiple access with orthogonal multiple access, it is possible to increase the capacity of a mobile communication network, compared with when orthogonal multiple access alone is used. In other words, when orthogonal multiple access alone is used, it is not possible to allocate a particular radio resource (a frequency, for example) simultaneously to user devices. However, when non-orthogonal multiple access is combined with orthogonal multiple access, it is possible to allocate a particular radio resource simultaneously to user devices.

RELATED ART DOCUMENT

Patent Document

Patent Document 1: Japanese Patent Application Laid-Open Publication No. 2013-009291

SUMMARY OF THE INVENTION

Problem to be Solved by the Invention

As described above, in NOMA, a base station appropriately determines the transmission powers with respect to user devices based on received SINRs at these user devices, and user devices located inside a cell area demodulate signals with high reception powers using interference cancellers and then remove the demodulated signals. Therefore, the user devices need to perform channel estimation with high precision. If the base station determines downlink transmission powers based on channel estimation results with low precision, it would cause inappropriate results such as the base station transmitting a signal at high power to a user device with a small path-loss. Moreover, if a user device demodulates signals with low precision, the demodulation precision for an interference signal with high reception power would be low and the demodulation precision for a desired signal directed to the user device would also be low. It would thus be difficult for the user device to demodulate the desired signal with high precision.

In view of the above circumstances, the present invention provides a base station that executes NOMA in which a user device is able to easily demodulate with high precision a desired signal directed to the user device.

Means of Solving the Problems

A base station according to the present invention is a base station for communicating with user devices and includes: a downlink data signal transmission power determiner that determines, according to reception qualities at user devices that are connected to the base station, downlink data signal transmission powers that are different from each other and are for transmitting downlink data signals directed to the user devices connected to the base station; a downlink reference signal transmission power determiner that determines a downlink reference signal transmission power for transmitting a downlink reference signal that is received by the user devices connected to the base station; and a radio signal transmitter that temporally continuously transmits OFDM (orthogonal frequency division multiplexing) symbols, wherein some of the OFDM symbols include data signals that are not orthogonal to each other, each of the data signals being directed to a corresponding one of the user devices connected to the base station, and the reference signal is arranged in the OFDM symbols temporally intermittently, wherein the downlink data signal transmission power determiner reduces a downlink data signal transmission power that is for a data signal directed to each user device and is in an OFDM symbol in which the reference signal is arranged to be lower than a downlink data signal transmission power that is for a data signal directed to the user device and is in an OFDM symbol in which the reference signal is not arranged, and wherein the downlink reference signal transmission power determiner determines the downlink reference signal transmission power to be higher than a downlink data signal transmission power that is for a data signal and is in the OFDM symbol in which the reference signal is not arranged.

Effect of the Invention

In the present invention, a downlink data signal transmission power that is for a data signal directed to each user device and is in an OFDM symbol in which a reference signal is arranged is reduced to be lower than a downlink data signal transmission power that is for a data signal directed to the user device and is in an OFDM symbol in which the reference signal is not arranged. It is thereby possible for a downlink reference signal transmission power to be configured higher than a downlink data signal transmission power that is for a data signal and is in the OFDM symbol in which the reference signal is not arranged. With the downlink reference signal transmission power being configured to be high, the user device is able to receive the reference signal with high precision. The user device will be able to perform channel estimation with high precision if the reference signal is used by the user device in estimating a channel state (for example, if the reference signal is a channel state information reference signal (CSI-RS) according to LTE Advanced, i.e., Release 10, of the 3GPP). The base station, by determining the downlink transmission power based on a high-precision channel estimation result, is able to transmit a signal at low power to a user device with a small path-loss, and to transmit a signal at high power to a user device with a large path-loss. In other words, the base station is able to appropriately perform the operations for NOMA. In a case in which the user device demodulates a desired signal and interference signals based on a channel estimation result, the user device is able to appropriately process demodulation with the use of the high-precision channel estimation result. If the reference signal is used by the user device in demodulating data signals (for example, if the reference signal is a demodulation reference signal (DM-RS) according to LTE Advanced, i.e., Release 10, of the 3GPP), the interference canceller of the user device is able to appropriately demodulate signals with high reception power (signals directed to other user devices). The interference canceller of the user device is thus able to appropriately process interference cancellation, and the user device is able to appropriately demodulate the desired signal.

Accordingly, the user device is able to demodulate the desired signal directed to the user device with high precision.

MODES FOR CARRYING OUT THE INVENTION

Various embodiments of the present invention will be described below with reference to the attached drawings.

First, an outline of non-orthogonal multiple access (NOMA) will be described.

Figure 1:
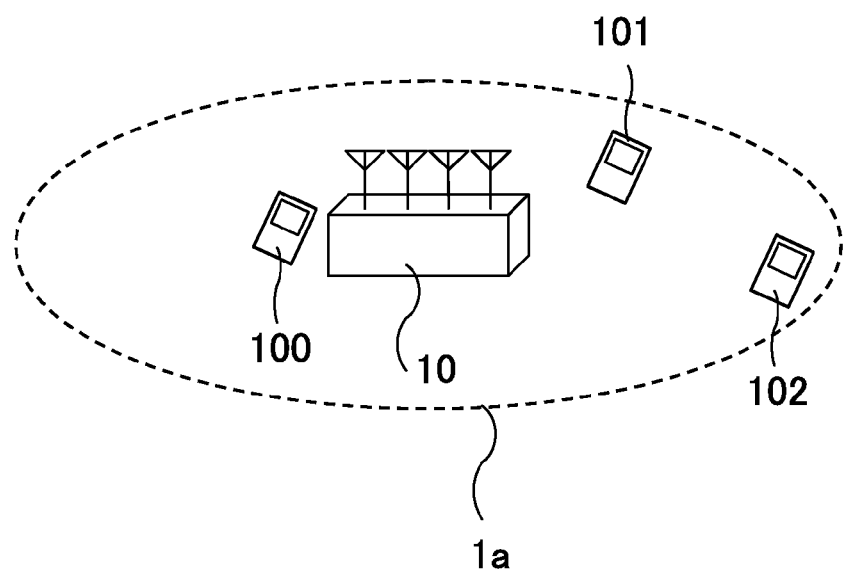
FIG. 1 is a schematic view of a base station and user devices for describing the outline of NOMA.

As FIG. 1 shows, a base station 10 communicates with user devices (user equipment, UE) 100 to 102. Reference number 1*a* in FIG. 1 indicates a cell area of the base station 10. The UE 102 is located at the edge of the cell area, i.e., the closest to the boundary of the cell area 1*a*, and is the farthest from the base station 10, with the largest path-loss (i.e., with the lowest received SINR). The UE 100 is located near the center of the cell area 1*a* and is the nearest to the base station 10, with the smallest path-loss (i.e., with the highest received SINR). The UE 101 is nearer to the base station 10 than the UE 102 and is farther from the base station 10 than the UE 100.

Figure 2:
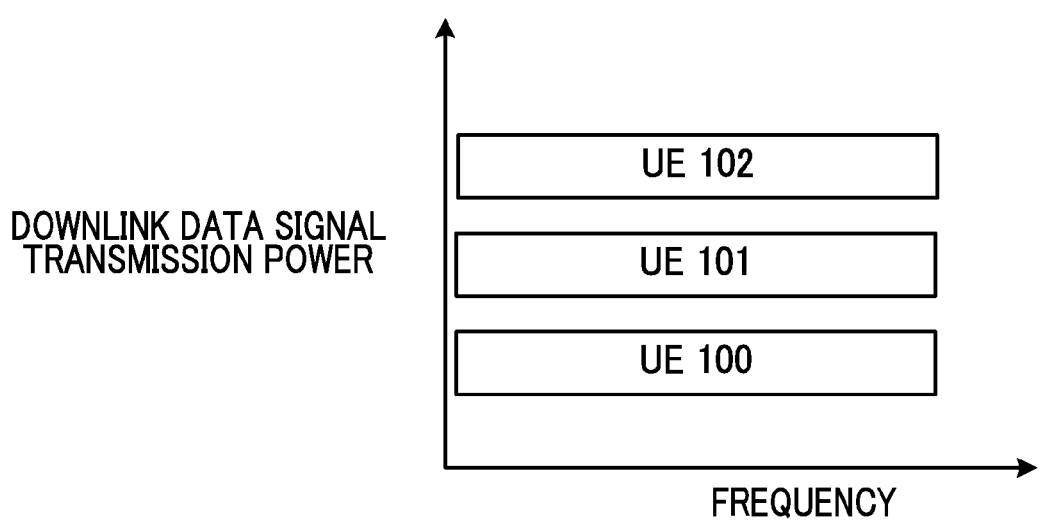
FIG. 2 is a diagram showing an example allocation of downlink transmission power by a base station to each user device in NOMA.

FIG. 2 is a diagram showing an example allocation of downlink data signal transmission power by a base station to each UE in NOMA. The base station 10 performs downlink data signal transmission to the UEs 100 to 102 simultaneously using the same frequency. In other words, the same frequency and time are allocated to the UEs 100 to 102. The base station 10 uses the highest downlink data signal transmission power for the transmission to the UE 102, which is the farthest, and uses the lowest downlink data signal transmission power for the transmission to the UE 100, which is the nearest.

Meanwhile, UEs that are connected to the base station 10 are not limited to the UEs 100 to 102. NOMA can be combined with orthogonal multiple access, and a frequency that is different from the frequency allocated to the UEs 100 to 102 may be allocated to UEs other than the UEs 100 to 102. The number of UEs to which the same frequency is simultaneously allocated (the number of UEs that are multiplexed in NOMA) is not limited to 3, and it may be 2, 4, or more.

From the viewpoint of each of the UEs 100 to 102, the signal with the highest reception power is the signal directed to the UE 102 and the signal with the lowest reception power is the signal directed to the UE 100. Each of the UEs 100 to 102 first demodulates the signal with the highest reception power. The demodulated signal is directed to the UE 102 that is the nearest to the boundary of the cell area 1a, and therefore, the UE 102 ends demodulation and uses the demodulated signal. Each of the other UEs 100 and 101 removes, from the received signal, an interference component corresponding to the demodulated signal using an interference canceller, and then demodulates the signal with the second highest reception power. The demodulated signal is directed to the UE 101 that is the second nearest to the boundary of the cell area 1a, and therefore, the UE 101 ends demodulation and uses the demodulated signal. By repeating demodulation and removal of a signal with high reception power as necessary in this way, each of the UEs 100 to 102 is able to demodulate a signal directed to itself. In this way, in NOMA, UE cancels signals that are transmitted from the desired base station 10 and are directed to other UEs until it demodulates a signal that is directed to the UE itself. The UEs 100 to 102 have an interference cancellation function. NOMA is not applied to UEs that do not have such an interference cancellation function.

Next, an example of a method used by a base station in NOMA to determine a downlink data signal transmission power directed to each UE is described. The base station determines a downlink data signal transmission power Pk regarding each UE using the following equation (1) for example.

$$P_k = \frac{P}{\sum_{i=1}^{K} (|h_i|^2 / N_i)^{-\alpha}} \left(\frac{|h_k|^2}{N_k}\right)^{-\alpha} \quad (1)$$

In equation (1), P is the sum of downlink data signal transmission powers directed to all UEs using the same frequency simultaneously (total downlink data signal transmission power). The subscript k added to each parameter identifies a UE concerning which the downlink data signal transmission power $P_k$ is determined. The subscript i identifies a UE in summation in the equation (1). The "K" denotes the total number of UEs that use the same frequency simultaneously (the number of UEs that are multiplexed in NOMA). The "h" denotes a downlink channel coefficient with respect to the UE, and the "N" denotes the sum of a thermal noise power and the interference powers from other base stations at the UE.

The following expression $$\frac{|h_i|^2}{N_i}$$

corresponds to an SINR at a UE$_i$, and the base station is able to recognize the SINR by referring to a channel quality indicator (CQI) that is reported from the UE$_i$. In equation (1), α is a coefficient that determines the allocation of downlink data signal transmission power and is greater than 0 and less than or equal to 1. Where α is 0, the downlink data signal transmission powers directed to the UEs that use the same frequency simultaneously are all equal. Since α is greater than 0 and less than or equal to 1, a low downlink data signal transmission power is allocated to a UE with a high SINR (with good reception quality). The nearer α is to 1, the greater the differences between the transmission powers directed to UEs relative to the differences between received SINRs at the UEs.

First Embodiment

Figure 3:
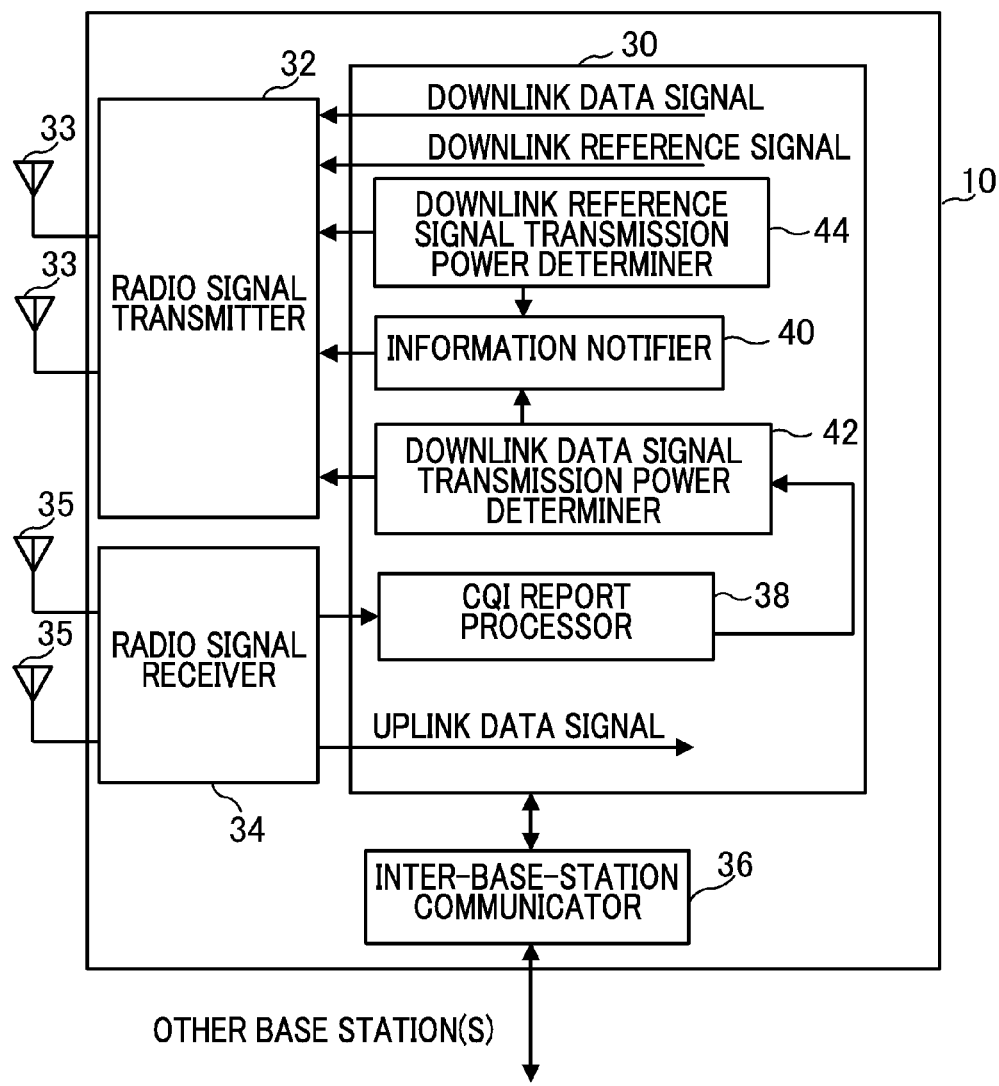
FIG. 3 is a block diagram showing a configuration of a base station according to a first embodiment of the present invention.

FIG. 3 is a block diagram showing a configuration of the base station 10 according to a first embodiment of the present invention. The base station 10 includes a controller 30, a radio signal transmitter 32, transmitting antennas 33, a radio signal receiver 34, at least one receiving antenna 35, and an inter-base-station communicator 36. The base station 10 may be an evolved Node B (eNode B) in LTE or an access point in any other radio access technology (Wi-Fi, for example).

The radio signal transmitter 32 is transmission circuitry for converting electrical signals into radio waves to be transmitted from the transmitting antennas 33 for the purpose of the base station 10 performing radio transmission to each UE. The transmitting antennas 33 form an adaptive antenna array. OFDMA is used as the downlink communication scheme. Therefore, the radio signal transmitter 32 temporally continuously transmits OFDM symbols. NOMA is also used as the downlink communication scheme. Accordingly, some of the OFDM symbols include data signals that are not orthogonal to each other, each of the data signals being directed to a corresponding one of the UEs connected to the base station. Furthermore, the radio signal transmitter 32 has an amplifier that controls downlink signal powers.

The radio signal receiver 34 is reception circuitry for converting radio waves received from the receiving antenna 35 into electrical signals for the purpose of the base station 10 performing radio reception from each UE. As the uplink communication scheme, single-carrier frequency division multiple access (SC-FDMA) is used for example, but other schemes may be used instead.

The inter-base-station communicator 36 is a communication interface used for the base station 10 to communicate with other base stations. Wire or radio is used for inter-base-station communication.

The controller 30 includes a CQI report processor 38, an information notifier 40, a downlink data signal transmission power determiner 42, and a downlink reference signal transmission power determiner 44. The controller 30 is a central processing unit (CPU) that operates in accordance with a computer program. The CQI report processor 38, the information notifier 40, the downlink data signal transmission power determiner 42, and the downlink reference signal transmission power determiner 44 are functional blocks accomplished by the controller 30 functioning in accordance with the computer program.

The controller 30 processes an uplink data signal that is transmitted from each UE connected to the base station 10 and is received by the radio signal receiver 34.

The CQI report processor 38 recognizes the SINRs at UEs connected to the base station 10 based on the CQIs that are reported from the UEs and are received by the radio signal receiver 34. The downlink data signal transmission power determiner 42 determines, for NOMA, a downlink data signal transmission power used for downlink data signal transmission to each UE connected to the base station 10 based on the SINR at the UE. The method for determining downlink data signal transmission powers in NOMA is as described above with reference to equation (1). It is noted, however, that equation (1) is one example, and other determination methods may be used. For example, the CQI report processor 38 may determine downlink data signal transmission powers based directly on CQIs (without recognizing the SINRs). The downlink data signal transmission power determiner 42 allocates higher downlink data signal transmission powers to UEs that are more distant from the base station (more precisely, UEs that have lower received SINRs, i.e., UEs with lower reception qualities).

The controller 30 supplies to the radio signal transmitter 32 downlink data signals that are each directed to one of the UEs connected to the base station 10. The radio signal transmitter 32 transmits via the transmitting antennas 33 radio signals having OFDM symbols that include these downlink data signals that are not orthogonal to each other, each of the data signals being directed to a corresponding one of the UEs. Here, the radio signal transmitter 32 transmits each data signal at the downlink data signal transmission power that has been determined by the downlink data signal transmission power determiner 42. Therefore, data signals are transmitted with different downlink data signal transmission powers to UEs for which the same frequency is used simultaneously in downlink data signal transmission.

The controller 30 supplies to the radio signal transmitter 32 a downlink reference signal that is received by the UEs connected to the base station 10. The radio signal transmitter 32 temporally intermittently transmits a downlink reference signal. As will be described later, the reference signal is temporally intermittently arranged in OFDM symbols that are temporally continuous. The downlink reference signal transmission power determiner 44 determines a downlink reference signal transmission power that is used in downlink reference signal transmission. The radio signal transmitter 32 transmits the reference signal at the downlink reference signal transmission power determined by the downlink reference signal transmission power determiner 44.

The information notifier 40 transmits various information to each of the UEs connected to the base station 10. The information includes several information elements that enable each UE to calculate downlink data signal transmission powers of the data signals directed to UEs that are multiplexed in NOMA. These information elements include an information element indicating a number K of UEs that are multiplexed in NOMA and other information elements. Furthermore, the information notifier 40 transmits to the UEs connected to the base station 10 an information element indicating transmission power of the reference signal used for channel estimation. The information element indicating the transmission power of the reference signal used for channel estimation may be included in the information elements that enable each UE to calculate the downlink data signal transmission powers. Moreover, when NOMA is applied, the information notifier 40 transmits to each UE an information element indicating the rank of the downlink data signal transmission power directed to the UE (for example, the information notifier 40 transmits to the UE with the lowest received SINR an information element indicating that the downlink data signal transmission power directed to the UE is the highest). Hereinafter, the rank of a downlink data signal transmission power will be called the rank of a UE in NOMA. The information element indicating the rank of a UE in NOMA may be included in the information elements that enable each UE to calculate the downlink data signal transmission powers.

Figure 4:
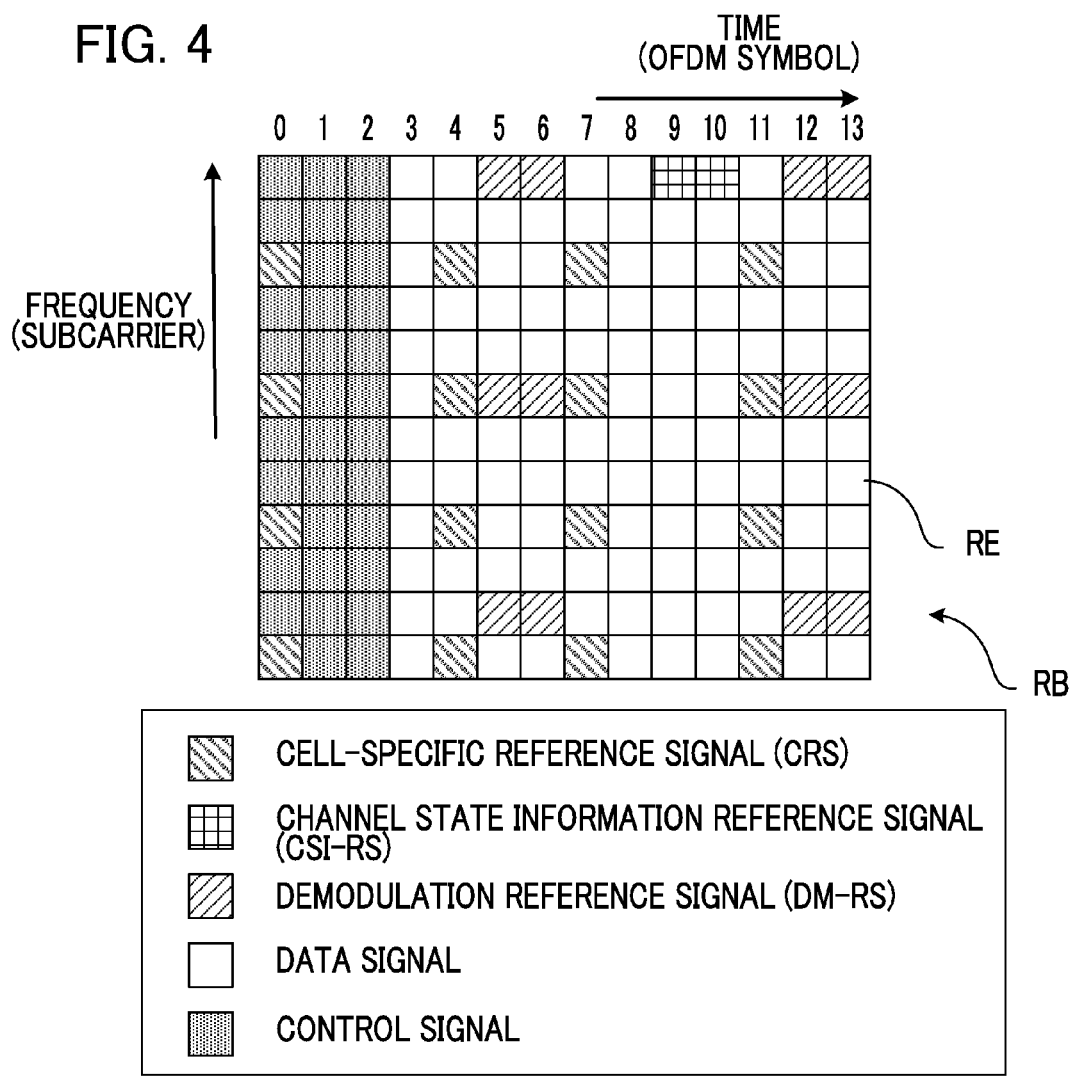
FIG. 4 is a diagram showing an example mapping of various signals in one resource block of downlink transmission.

FIG. 4 shows an example mapping of various signals in one resource block of downlink transmission in LTE Advanced. The reference sign RB indicates one resource block and each square indicates a resource element that is formed by one subcarrier, which is the smallest resource unit, and one OFDM symbol. The vertical axis indicates frequency (subcarrier), and the horizontal axis indicates time (OFDM symbol).

In the 3GPP, reference signals (RSs) are classified into cell-specific RSs (CRSs), channel state information RSs (CSI-RSs), and demodulation RSs (DM-RSs). DM-RSs may also be called UE-specific RSs. LTE, i.e., Release 8, of the 3GPP requires the use of CRSs. CRSs support a maximum of 4 transmission antennas in a base station (cell). CRSs are used in channel state information determination (channel state estimation), data demodulation, reception quality (RSRP or reference signal reception power) measurement of a signal from a cell, and control channel (PDCCH or physical dedicated control channel) demodulation.

In LTE Advanced, i.e., Release 10 and beyond, of the 3GPP, the use of CSI-RSs and DM-RSs will be possible. CSI-RSs support a maximum of 8 transmission antennas in a base station (cell). CSI-RSs will only be used in channel state information determination (channel state estimation). Therefore, CSI-RSs are transmitted at lower density (longer intervals) compared with CRSs.

DM-RSs support a maximum of 8 transmission streams that may be transmitted from a base station (cell). DM-RSs will be used in demodulating data signals dedicated to a mobile communication terminal (user device or UE). DM-RSs are pre-coded in a similar way as data signals, and therefore, mobile communication terminals are able to demodulate data signals by DM-RSs without pre-coding information.

In LTE Advanced, CRSs may also possibly be used in reception quality (RSRP) measurement of signals from a cell and in control channel demodulation.

As FIG. 4 shows, downlink data signals are transmitted using a large number of OFDM symbols. Each reference signal is temporally intermittently arranged in the OFDM symbols. In the example of FIG. 4, the CRSs are arranged in the OFDM symbols numbered 0, 4, 7, and 11, and the DM-RSs are arranged in the OFDM symbols numbered 5, 6, 12, and 13. Numbers 5 and 6 are continuous and numbers 12 and 13 are also continuous. However, the two continuous pairs are spread apart, and therefore, the DM-RSs are arranged intermittently. The CSI-RS are arranged in the OFDM symbols numbered 9 and 10. Although numbers 9 and 10 are continuous, the continuous pair is spread apart in resource blocks, and thus, the CSI-RS are arranged intermittently.

Figure 5:
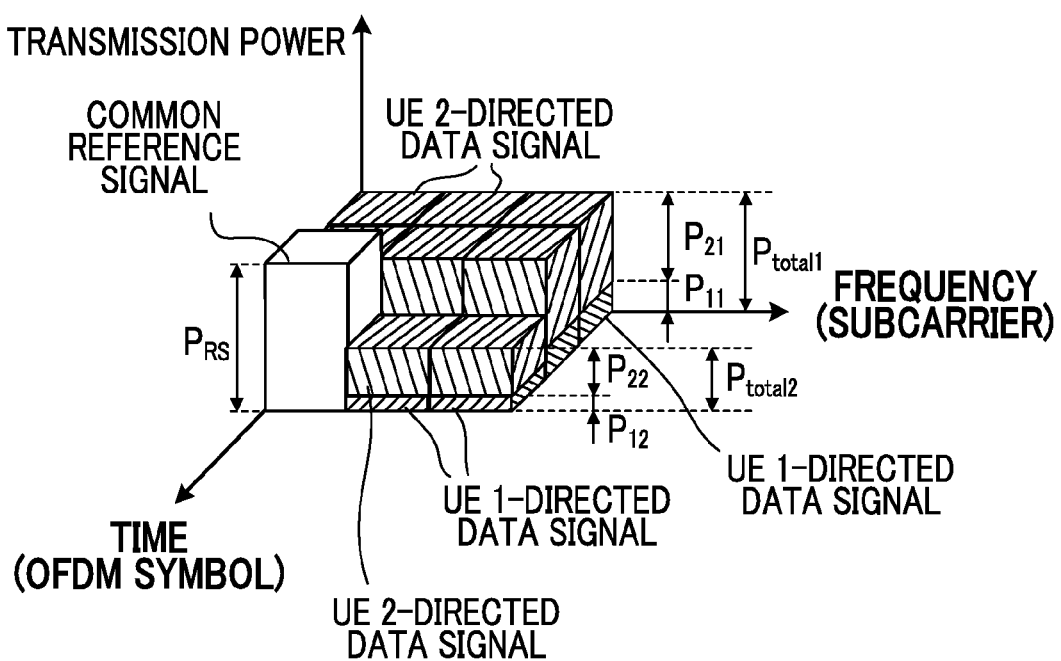
FIG. 5 is a diagram showing a transmission scheme of signals in NOMA according to the first embodiment of the present invention.

FIG. 5 is a diagram showing a transmission scheme of signals in NOMA according to the first embodiment of the present invention. Here, it is assumed that a UE 1 is located at the center of a cell area, i.e., near the base station 10, and a UE 2 is located at the edge of the cell area, i.e., far from the base station 10. Therefore, a data signal directed to the UE 1 is transmitted from the base station 10 at low transmission power, and a data signal directed to the UE 2 is transmitted from the base station 10 at high transmission power.

In an OFDM symbol in which a reference signal is not arranged, the downlink data signal transmission power determiner 42 determines a transmission power of a data signal directed to the UE 1 to be $P_{11}$ and a transmission power of a data signal directed to the UE 2 to be $P_{21}$, based on CQIs reported from the UEs as described above, according to equation (1) for example. The sum of these data signal transmission powers is $P_{total1}$.

On the other hand, the downlink data signal transmission power determiner 42 reduces a downlink data signal transmission power that is for a data signal directed to each UE and is in an OFDM symbol in which a common reference signal is arranged to be lower than the downlink data signal transmission power that is for a data signal directed to the UE and is in the OFDM symbol in which the common reference signal is not arranged. In the OFDM symbol in which the common reference signal is arranged, the downlink data signal transmission power determiner 42 determines a transmission power of a data signal directed to the UE 1 to be $P_{12}$ and a transmission power of a data signal directed to the UE 2 to be $P_{22}$. The sum of these data signal transmission powers is $P_{total2}$. For example, the downlink data signal transmission power determiner 42 is able to obtain the downlink data signal transmission powers $P_{12}$ and $P_{22}$ in the OFDM symbol in which the common reference signal is not arranged by multiplying, by a coefficient X (a positive number less than 1), each of the downlink data signal transmission powers $P_{11}$ and $P_{21}$, respectively, in the OFDM symbol in which the common reference signal is not arranged. Therefore, $P_{11}/P_{21}=P_{12}/P_{22}$. In other words, the ratio of the transmission power for data signals directed to the UE 1 to the transmission power for data signals directed to the UE 2 does not change between OFDM symbols in which common reference signals are not arranged and OFDM symbols in which common reference signals are arranged. The coefficient X is dependent on the number K of UEs that use the same frequency simultaneously.

In FIG. 5, the common reference signal is a CRS or a CSI-RS for example. The downlink reference signal transmission power determiner 44 determines a transmission power $P_{RS}$ of the common reference signal to be higher than the total downlink data signal transmission power $P_{total1}$ of the data signals in an OFDM symbol in which the common reference signal is not arranged. With the downlink reference signal transmission power being configured to be high, each UE is able to receive the common reference signal with high precision.

The reason that a downlink data signal transmission power in an OFDM symbol in which a reference signal is arranged is reduced is that since there is a limit in the transmission power used in the radio signal transmitter 32, the reference signal cannot be transmitted at the high transmission power $P_{RS}$ if the downlink data signal transmission power is maintained at the same level as the downlink data signal transmission power in an OFDM symbol in which the reference signal is not arranged. In other words, by reducing the downlink data signal transmission power that is for a data signal directed to each UE and is in the OFDM symbol in which the reference signal is arranged to be lower than the downlink data signal transmission power that is for a data signal directed to the UE and is in the OFDM symbol in which the reference signal is not arranged, it is possible to configure the downlink reference signal transmission power to be higher than the downlink data signal transmission power of a data signal in the OFDM symbol in which the reference signal is not arranged. The downlink reference signal transmission power determiner 44 may determine the transmission power $P_{RS}$ of the common reference signal based on the number K of UEs that use the same frequency simultaneously. Alternatively, the downlink reference signal transmission power determiner 44 may calculate the transmission power $P_{RS}$ of the common reference signal based on the downlink data signal transmission powers $P_{12}$ and $P_{22}$, which are determined by the downlink data signal transmission power determiner 42, or the total data signal transmission power $P_{total2}$.

UEs are able to perform channel estimation with high precision because CRSs or CSI-RSs are used by the UEs to estimate channel states. The base station 10 is able to transmit a signal to a UE with a smaller path-loss at lower power and transmit a signal to a UE with greater path-loss at higher power by determining downlink data signal transmission powers based on highly precise channel estimation results. In other words, the base station 10 is able to appropriately perform the operations of NOMA. In a case in which a UE demodulates a desired signal and interference signals based on channel estimation results, the UE is able to appropriately process demodulation with the use of highly precise channel estimation results. Accordingly, the UE is able to demodulate the desired signal directed to the UE with high precision.

Figure 6:
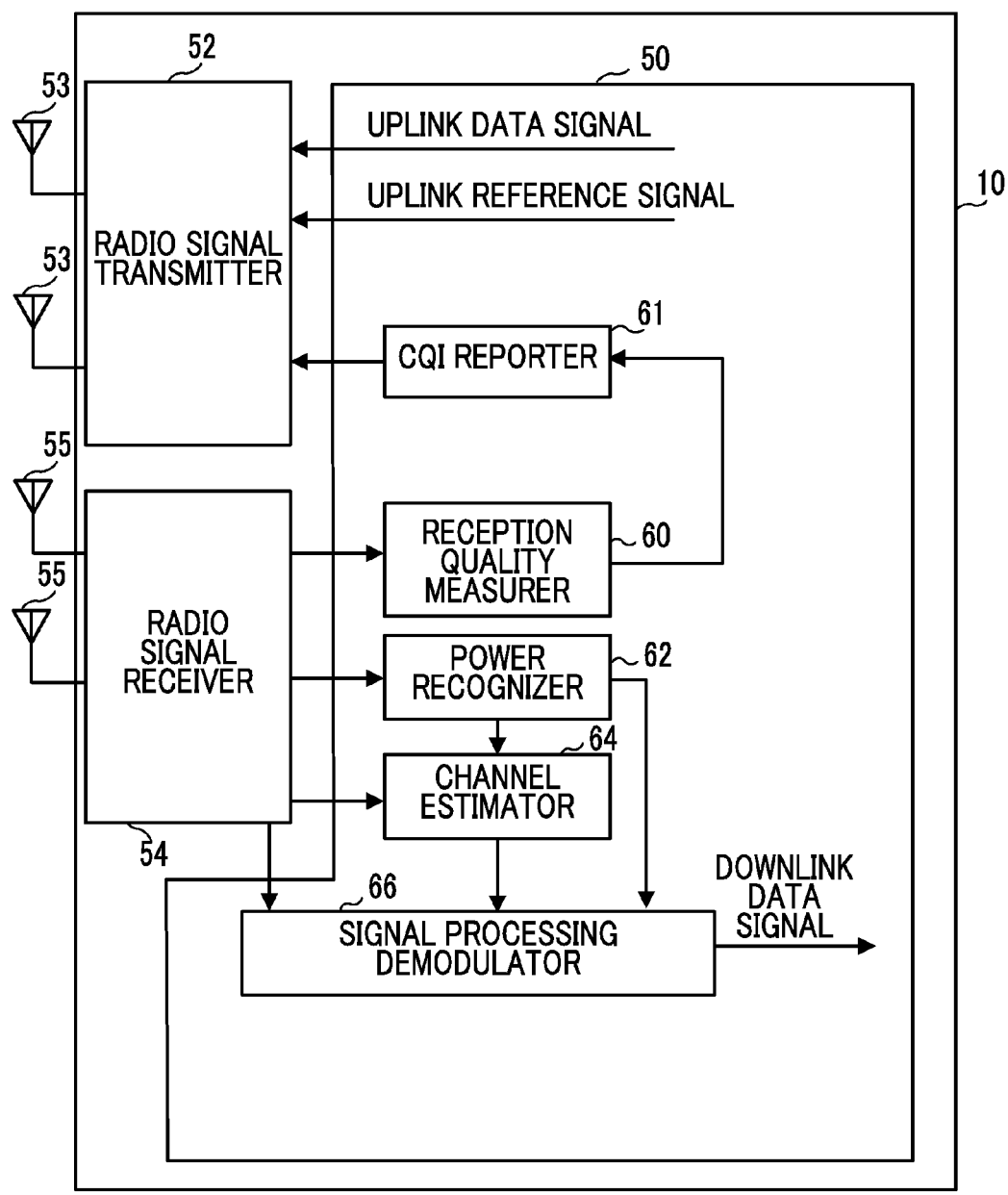
FIG. 6 is a block diagram showing a configuration of a user device according to the first embodiment of the present invention.

FIG. 6 is a block diagram showing a configuration of a UE according to the first embodiment of the present invention. The aforementioned UE having an interference cancellation function (for example, the UE 100) is configured in this way. The UE includes a controller 50, a radio signal transmitter 52, at least one transmitting antenna 53, a radio signal receiver 54, and receiving antennas 55.

The radio signal transmitter 52 is transmission circuitry for converting electrical signals into radio waves to be transmitted from the transmitting antenna 53 for the purpose of the UE performing radio transmission to a desired base station. The radio signal receiver 54 is reception circuitry for converting radio waves received from the receiving antennas 55 into electrical signals for the purpose of the UE performing radio reception from the desired base station. The receiving antennas 55 form an adaptive antenna array.

The controller 50 includes a reception quality measurer 60, a CQI reporter 61, a power recognizer 62, a channel estimator 64, and a signal processing demodulator 66. The controller 50 is a central processing unit (CPU) that operates in accordance with a computer program. The reception quality measurer 60, the CQI reporter 61, the power recognizer 62, the channel estimator 64, and the signal processing demodulator 66 are functional blocks accomplished by the controller 50 functioning in accordance with the computer program.

The controller 50 supplies to the radio signal transmitter 52 an uplink data signal and an uplink reference signal (for example, a sounding reference signal). The radio signal transmitter 52 transmits the signals to the desired base station via the transmitting antenna 53. The reception quality measurer 60 measures the SINRs of the radio signals received by the radio signal receiver 54. The CQI reporter 61 generates CQIs based on the SINRs and supplies the CQIs to the radio signal transmitter 52. The radio signal transmitter 52 transmits the CQIs to the desired base station via a control channel.

The radio signal receiver 54 receives radio signals that are transmitted from the desired base station and include downlink data signals that are not orthogonal to each other and a downlink reference signal. Then, the radio signal receiver 54 supplies, to the controller 50, received signals obtained from the radio signals. Furthermore, the radio signal receiver 54 receives radio signals indicating the following information elements: an information element indicating a transmission power of a reference signal used for channel estimation; an information element indicating the rank of the UE in NOMA; and information elements that enable the UEs to calculate downlink data signal transmission powers of the data signals directed to the UEs that are multiplexed in NOMA. Then, the radio signal receiver 54 supplies, to the controller 50, received signals obtained from the radio signals.

The power recognizer 62 recognizes the transmission power of the reference signal used for channel estimation from the information element indicating the transmission power of the reference signal used for channel estimation. The power recognizer 62 recognizes downlink data signal transmission powers directed to the UEs that are multiplexed in NOMA, from the information elements that enable the UEs to calculate the downlink data signal transmission powers. The channel estimator 64 performs channel estimation using the downlink reference signal on the basis of the transmission power that is for the reference signal used for channel estimation and is recognized by the power recognizer 62.

The signal processing demodulator 66 demodulates a data signal directed to the UE based on the downlink data signal transmission powers that are directed to the UEs multiplexed in NOMA and are recognized by the power recognizer 62, and based on the channel estimation results obtained by the channel estimator 64. The detailed steps in the process are as follows.

The signal processing demodulator 66 first demodulates a data signal with the highest reception power among the received signals supplied from the radio signal receiver 54 based on the channel estimation results and the downlink data signal transmission powers. The demodulated data signal is a data signal directed to a UE located the nearest to the boundary of the cell area (a data signal transmitted at the highest downlink data signal transmission power from the base station 10). When the signal processing demodulator 66 determines that this data signal is directed to its own UE based on the rank of the UE in NOMA, the signal processing demodulator 66 outputs the data signal and ends demodulation. The UE will use this data signal. The UE does not need to demodulate and cancel signals directed to other UEs.

When the signal processing demodulator 66 determines that this data signal is not directed to its own UE, the signal processing demodulator 66, functioning as an interference canceller, removes an interference component corresponding to the demodulated signal from the received signal supplied from the radio signal receiver 54, and demodulates a data signal with the second highest reception power. The demodulated signal is a data signal directed to a UE located the second nearest to the boundary of the cell area (a data signal transmitted at the second highest downlink data signal transmission power from the base station 10). When the signal processing demodulator 66 determines that this data signal is directed to its own UE based on the rank of the UE in NOMA, the signal processing demodulator 66 outputs the data signal and ends demodulation. The UE will use this data signal. By repeating demodulation and removal of a signal with high reception power in this way, the signal processing demodulator 66 is able to demodulate the data signal directed to its own UE.

Next, a detailed explanation will be given of the information elements that are transmitted from the information notifier 40 of the base station 10 to each UE connected to the base station 10 to enable the UE to calculate downlink data signal transmission powers. The information elements include the following.

An information element indicating the number K of UEs multiplexed in NOMA (the number of UEs that use the same frequency simultaneously).

An information element indicating the transmission power $P_{RS}$ of the common reference signal.

An information element indicating a ratio between downlink data signal transmission powers directed to the UEs.

For example, where K=2, a ratio $P_{diff}=P_{11}/P_{21}=P_{12}/P_{22}$ (see FIG. 5). It is noted that the ratio $P_{diff}$ may be its own inverse number or may be represented by dB.

An information element indicating a ratio $P_x$ between the transmission power for the common reference signal and the sum of downlink data signal transmission powers for data signals directed to the UEs in an OFDM symbol in which the reference signal is not arranged.

Here, $P_x=P_{RS}/P_{total1}$ see FIG. 5). It is noted that the ratio $P_x$ may be its own inverse number or may be represented by dB.

An information element indicating a ratio $P_y$ between the transmission power for the common reference signal and the sum of downlink data signal transmission powers for data signals directed to the UEs in an OFDM symbol in which the reference signal is arranged.

Here, $P_y=P/P_{total2}$ see FIG. 5). It is noted that the ratio $P_y$ may be its own inverse number or may be represented by dB.

An information element indicating the rank of the UE in NOMA.

The power recognizer 62 of each UE calculates, from $P_{RS}$ and $P_x$, the sum $P_{total1}$ of the downlink data signal transmission powers in the OFDM symbol in which the reference signal is not arranged. The power recognizer 62 of each UE also calculates, from $P_{RS}$ and $P_y$, the sum $P_{total2}$ of the downlink data signal transmission powers in the OFDM symbol in which the reference signal is arranged.

Furthermore, where K=2, the power recognizer 62 of each UE calculates, from $P_{diff}$ and $P_{total1}$, the downlink data signal transmission powers $P_{11}$ and $P_{21}$ in the OFDM symbol in which the reference signal is not arranged. The power recognizer 62 of each UE also calculates, from $P_{diff}$ and $P_{total2}$, the downlink data signal transmission powers $P_{12}$ and $P_{22}$ in the OFDM symbol in which the reference signal is arranged.

The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power. Using these downlink data signal transmission powers, the signal processing demodulator 66 demodulates signals that have undergone multi-level modulation (desired signals and interference signals), taking their constellations into consideration. Accordingly, the UE 1 that receives a desired data signal at low power demodulates the desired data signal using both $P_{11}$ and $P_{21}$ and both $P_{12}$ and $P_{22}$. The UE 2 that receives a desired data signal at high power demodulates the desired data signal using $P_{21}$ and $P_{22}$ alone.

So far, description has been given of the information elements that the base station 10 transmits to the UEs and of the detailed operation of the UEs in a case in which the number K of UEs multiplexed in NOMA is two. In a case in which the number of UEs that are multiplexed in NOMA is three or more, the information elements that the base station 10 transmits to the UEs can be adequately changed, such that the power recognizers 62 of the UEs are able to calculate each downlink data signal transmission power.

In this embodiment, the information notifier 40 of the base station 10 notifies each UE of information that enables the UE to calculate the downlink data signal transmission powers of data signals directed to the UEs in OFDM symbols in which at least common reference signals are arranged. Therefore, in a case in which the downlink data signal transmission powers are reduced in OFDM symbols in which common reference signals are arranged, the power recognizers 62 of the UEs are able to calculate the downlink data signal transmission power to each UE in the OFDM symbols in which common reference signals are arranged. Using the calculation results, the signal processing demodulators 66 of the UEs are able to perform signal demodulation processing. Moreover, the base station 10 transmits to each UE information elements indicating ratios between transmission powers, and not information indicating the absolute values of the downlink data signal transmission powers, and each UE calculates the absolute values of the downlink data signal transmission powers based on these information elements. It is thus possible to reduce the amount of information that the base station 10 transmits to each UE. Although there are cases in which the transmission powers $P_{total1}$, $P_{total2}$, and $P_{RS}$ in the base station 10 are changed, it is not necessary for the base station 10 to transmit to each UE the absolute values of the downlink data signal transmission powers every time the transmission powers in the base station 10 are changed because each UE calculates the absolute values of the downlink data signal transmission powers using the information elements indicating the ratios between the transmission powers.

Furthermore, in this embodiment, the base station 10 notifies each UE of an information element that enables the UE to calculate the downlink data signal transmission powers of data signals directed to the UEs in OFDM symbols in which common reference signals are not arranged (i.e., the information element indicating the ratio $P_x$ between the transmission power for the common reference signal and the sum of downlink data signal transmission powers for data signals to UEs in an OFDM symbol in which a reference signal is not arranged). Therefore, it is possible to reduce the amount of information that the base station 10 transmits to each UE. At the same time, the power recognizers 62 of the UEs are able to calculate the downlink data signal transmission power to each UE in an OFDM symbol in which a common reference signal is arranged and calculate the downlink data signal transmission power to each UE in an OFDM symbol in which the common reference signal is not arranged.

Second Embodiment

The information elements that are transmitted from the information notifier 40 of the base station 10 to each UE connected to the base station 10 to enable the UE to calculate the downlink data signal transmission powers may also be configured as below. In this case, the configurations of the base station 10 and the UEs may be the same as those of the first embodiment.

The information elements include the following.
An information element indicating the number K of UEs multiplexed in NOMA (the number of UEs that use the same frequency simultaneously).
An information element indicating the transmission power $P_{RS}$ of the common reference signal.
An information element indicating a ratio between downlink data signal transmission powers directed to the UEs.

For example, where K=2, a ratio $P_{diff}=P_{11}/P_{21}=P_{12}/P_{22}$ (see FIG. 5). It is noted that the ratio $P_{diff}$ may be its own inverse number or may be represented by dB.

An information element indicating a ratio $P_x$ between the transmission power for the common reference signal and the sum of downlink data signal transmission powers for data signals directed to the UEs in an OFDM symbol in which the reference signal is not arranged.

Here, $P_x=P_{RS}/P_{total1}$ see FIG. 5). It is noted that the ratio $P_x$ may be its own inverse number or may be represented by dB.

An information element indicating a ratio $P_z$ between the sum of downlink data signal transmission powers for data signals directed to the UEs in an OFDM symbol in which the reference signal is not arranged and the sum of downlink data signal transmission powers for data signals directed to the UEs in an OFDM symbol in which the reference signal is arranged.

Here, $P_z=P_{total1}/P_{total2}$ see FIG. 5). It is noted that the ratio $P_z$ may be its own inverse number or may be represented by dB.

An information element indicating the rank of the UE in NOMA.

The power recognizer 62 of each UE calculates, from $P_{RS}$ and $P_x$, the sum $P_{total1}$ of the downlink data signal transmission powers in the OFDM symbol in which the reference signal is not arranged. The power recognizer 62 of each UE also calculates, from $P_{total1}$ and $P_z$, the sum $P_{total2}$ of the downlink data signal transmission powers in the OFDM symbol in which the reference signal is arranged.

Furthermore, where K=2, the power recognizer 62 of each UE calculates, from $P_{diff}$ and $P_{total1}$, the downlink data signal transmission powers $P_{11}$ and $P_{21}$ in the OFDM symbol in which the reference signal is not arranged. The power recognizer 62 of each UE also calculates, from $P_{diff}$ and $P_{total2}$, the downlink data signal transmission powers $P_{12}$ and $P_{22}$ in the OFDM symbol in which the reference signal is arranged.

The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power. Using these downlink data signal transmission powers, the signal processing demodulator 66 demodulates signals that have undergone multi-level modulation (desired signals and interference signals), taking their constellations into consideration. Accordingly, the UE 1 that receives a desired data signal at low power demodulates the desired data signal using both $P_{11}$ and $P_{21}$ and both $P_{12}$ and $P_{22}$. The UE 2 that receives a desired data signal at high power demodulates the desired data signal using $P_{21}$ and $P_{22}$ alone.

So far, description has been given of the information elements that the base station 10 transmits to the UEs and of the detailed operation of the UEs in a case in which the number K of UEs multiplexed in NOMA is two. In a case in which the number of UEs that are multiplexed in NOMA is three or more, the information elements that the base station 10 transmits to the UEs can be adequately changed, such that the power recognizers 62 of the UEs are able to calculate each downlink data signal transmission power.

In this embodiment, the information notifier 40 of the base station 10 notifies each UE of information that enables the UE to calculate the downlink data signal transmission powers of data signals directed to the UEs in OFDM symbols in which at least common reference signals are arranged.

Therefore, in a case in which the downlink data signal transmission powers are reduced in OFDM symbols in which common reference signals are arranged, the power recognizers 62 of the UEs are able to calculate the downlink data signal transmission power to each UE in the OFDM symbols in which common reference signals are arranged. Using the calculation results, the signal processing demodulators 66 of the UEs are able to perform signal demodulation processing. Moreover, the base station 10 transmits to each UE information elements indicating ratios between transmission powers, and not information indicating the absolute values of the downlink data signal transmission powers, and each UE calculates the absolute values of the downlink data signal transmission powers based on these information elements. It is thus possible to reduce the amount of information that the base station 10 transmits to each UE. Although there are cases in which the transmission powers $P_{total1}$, $P_{total2}$, and $P_{RS}$ in the base station 10 are changed, it is not necessary for the base station 10 to transmit to each UE absolute values of the downlink data signal transmission powers every time the transmission powers in the base station 10 are changed because each UE calculates the absolute values of the downlink data signal transmission powers using the information elements indicating the ratios between the transmission powers.

Furthermore, in this embodiment, the base station 10 notifies each UE of an information element that enables the UE to calculate the downlink data signal transmission powers of data signals directed to the UEs in OFDM symbols in which common reference signals are not arranged (i.e., the information element indicating the ratio $P_x$ between the transmission power for the common reference signal and the sum of downlink data signal transmission powers for data signals to UEs in an OFDM symbol in which a reference signal is not arranged). Therefore, it is possible to reduce the amount of information that the base station 10 transmits to each UE. At the same time, the power recognizers 62 of the UEs are able to calculate the downlink data signal transmission power to each UE in an OFDM symbol in which a common reference signal is arranged and calculate the downlink data signal transmission power to each UE in an OFDM symbol in which the common reference signal is not arranged.

Third Embodiment

The information elements that are transmitted from the information notifier 40 of the base station 10 to each UE connected to the base station 10 to enable the UE to calculate the downlink data signal transmission powers may also be configured as below. In this case, the configurations of the base station 10 and the UEs may be the same as those of the first embodiment.

The information elements include the following.

An information element indicating the number K of UEs multiplexed in NOMA (the number of UEs that use the same frequency simultaneously).

An information element indicating the transmission power $P_{RS}$ of the common reference signal.

An information element indicating a ratio between downlink data signal transmission powers directed to the UEs.

For example, where K=2, ratio $P_{diff}=P_{11}/P_{21}=P_{12}/P_{22}$ (see FIG. 5). It is noted that the ratio $P_{diff}$ may be its own inverse number or may be represented by dB.

An information element indicating a ratio $P_y$ between the transmission power for the common reference signal and the sum of downlink data signal transmission powers for data signals directed to the UEs in an OFDM symbol in which the reference signal is arranged.

Here, $P_y=P_{RS}/P_{total2}$ (see FIG. 5). It is noted that the ratio $P_y$ may be its own inverse number or may be represented by dB.

An information element indicating a ratio $P_z$ between the sum of downlink data signal transmission powers for data signals directed to the UEs in an OFDM symbol in which the reference signal is not arranged and the sum of downlink data signal transmission powers for data signals directed to the UEs in an OFDM symbol in which the reference signal is arranged.

Here, $P_z=P_{total1}/P_{total2}$ see FIG. 5). It is noted that the ratio $P_z$ may be its own inverse number or may be represented by dB.

An information element indicating the rank of the UE in NOMA.

The power recognizer 62 of each UE calculates, from $P_{RS}$ and $P_y$, the sum $P_{total2}$ of the downlink data signal transmission powers in the OFDM symbol in which the reference signal is arranged. The power recognizer 62 of each UE also calculates, from $P_{total2}$ and $P_z$, the sum $P_{total1}$ of the downlink data signal transmission powers in the OFDM symbol in which the reference signal is not arranged.

Furthermore, where K=2, the power recognizer 62 of each UE calculates, from $P_{diff}$ and $P_{total1}$, the downlink data signal transmission powers $P_{11}$ and $P_{21}$ in the OFDM symbol in which the reference signal is not arranged. The power recognizer 62 of each UE also calculates, from $P_{diff}$ and $P_{total2}$, the downlink data signal transmission powers $P_{12}$ and $P_{22}$ in the OFDM symbol in which the reference signal is arranged.

The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power. Using these downlink data signal transmission powers, the signal processing demodulator 66 demodulates signals that have undergone multi-level modulation (desired signals and interference signals), taking their constellations into consideration. Accordingly, the UE 1 that receives a desired data signal at low power demodulates the desired data signal using both $P_{11}$ and $P_{21}$ and both $P_{12}$ and $P_{22}$. The UE 2 that receives a desired data signal at high power demodulates the desired data signal using $P_{21}$ and $P_{22}$ alone.

So far, description has been given of the information elements that the base station 10 transmits to the UEs and of the detailed operation of the UEs in a case in which the number K of UEs multiplexed in NOMA is two. In a case in which the number of UEs that are multiplexed in NOMA is three or more, the information elements that the base station 10 transmits to the UEs can be adequately changed, such that the power recognizers 62 of the UEs are able to calculate each downlink data signal transmission power.

In this embodiment, the information notifier 40 of the base station 10 notifies each UE of information that enables the UE to calculate the downlink data signal transmission powers of data signals directed to the UEs in OFDM symbols in which at least common reference signals are arranged. Therefore, in a case in which the downlink data signal transmission powers are reduced in OFDM symbols in which common reference signals are arranged, the power recognizers 62 of the UEs are able to calculate the downlink data signal transmission power to each UE in the OFDM symbols in which common reference signals are arranged. Using the calculation results, the signal processing demodulators 66 of the UEs are able to perform signal demodulation processing. Moreover, the base station 10 transmits to each UE information elements indicating ratios between transmission powers, and not information indicating the absolute values of the downlink data signal transmission powers, and each UE calculates the absolute values of the downlink data signal transmission powers based on these information elements. It is thus possible to reduce the amount of information that the base station 10 transmits to each UE. Although there are cases in which the transmission powers $P_{total1}$, $P_{total2}$, and $P_{RS}$ in the base station 10 are changed, it is not necessary for the base station 10 to transmit to each UE the absolute values of the downlink data signal transmission powers every time the transmission powers in the base station 10 are changed because each UE calculates the absolute values of the downlink data signal transmission powers using the information elements indicating the ratios between the transmission powers.

Furthermore, in this embodiment, the base station 10 notifies each UE of an information element that enables the UE to calculate the downlink data signal transmission powers of data signals directed to the UEs in OFDM symbols in which common reference signals are not arranged (i.e., the information element indicating the ratio $P_z$ between the sum of downlink data signal transmission powers for data signals directed to the UEs in an OFDM symbol in which the reference signal is not arranged and the sum of downlink data signal transmission powers for data signals directed to the UEs in an OFDM symbol in which the reference signal is arranged). Therefore, it is possible to reduce the amount of information that the base station 10 transmits to each UE. At the same time, the power recognizers 62 of the UEs are able to calculate the downlink data signal transmission power to each UE in an OFDM symbol in which a common reference signal is arranged and calculate the downlink data signal transmission power to each UE in an OFDM symbol in which the common reference signal is not arranged.

Fourth Embodiment

In the first to third embodiments, the ratio between the transmission power for data signals directed to a particular UE and the transmission power for data signals directed to another UE does not change between OFDM symbols in which common reference signals are not arranged and OFDM symbols in which common reference signals are arranged. That is, $P_{11}/P_{21}=P_{12}/P_{22}$. However, the downlink data signal transmission power determiner 42 of the base station 10 may make the ratio between downlink data signal transmission powers of data signals directed to the user devices in the OFDM symbols in which common reference signals are arranged different from the ratio between downlink data signal transmission powers of data signals directed to the user devices in the OFDM symbols in which common reference signals are not arranged.

Figure 7:
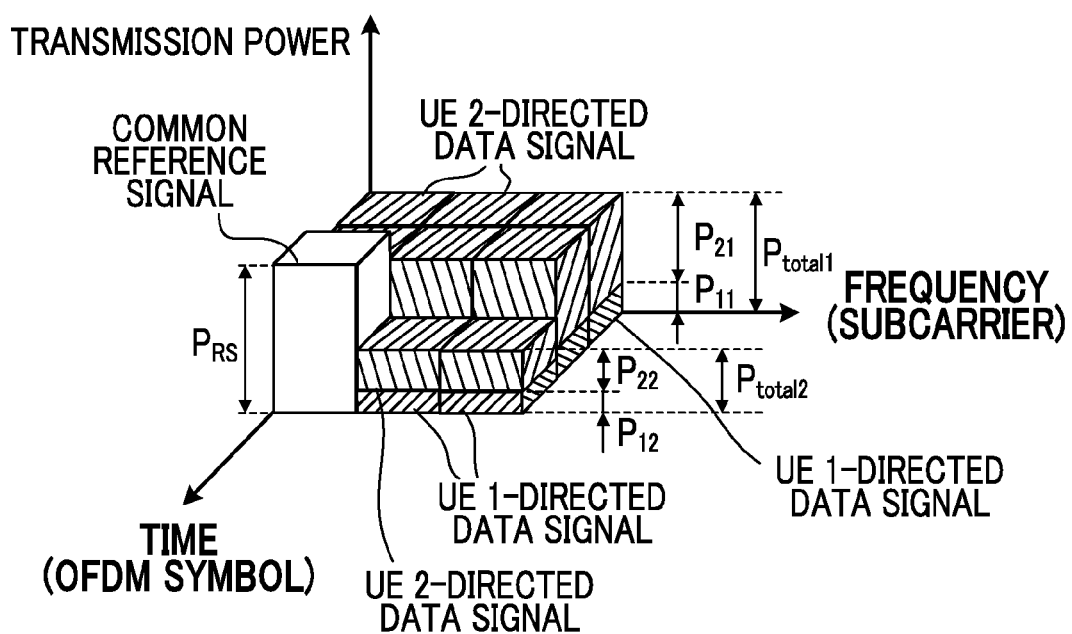
FIG. 7 is a diagram showing a transmission scheme of signals in NOMA according to a fourth embodiment of the present invention.

FIG. 7 is a diagram showing a transmission scheme of signals in NOMA according to a fourth embodiment of the present invention. Here, it is assumed that a UE 1 is located at the center of a cell area, i.e., near the base station 10, and a UE 2 is located at the edge of the cell area, i.e., far from the base station 10. Therefore, a data signal directed to the UE 1 is transmitted from the base station 10 at low transmission power, and a data signal directed to the UE 2 is transmitted from the base station 10 at high transmission power.

In an OFDM symbol in which a reference signal is not arranged, the downlink data signal transmission power determiner 42 determines a transmission power of a data signal directed to the UE 1 to be $P_{11}$ and a transmission power of a data signal directed to the UE 2 to be $P_{21}$, based on CQIs reported from the UEs as described above, according to equation (1) for example. The sum of the data signal transmission powers is $P_{total1}$.

In an OFDM symbol in which a common reference signal is arranged, on the other hand, the downlink data signal transmission power determiner 42 reduces a downlink data signal transmission power for a data signal directed to each UE to be lower than a downlink data signal transmission power that is for a data signal directed to the UE and is in an OFDM symbol in which the common reference signal is not arranged. In the OFDM symbol in which the common reference signal is arranged, the downlink data signal transmission power determiner 42 determines a transmission power of the data signal directed to the UE 1 to be $P_{12}$ and a transmission power of the data signal directed to the UE 2 to be $P_{22}$. The sum of the data signal transmission powers is $P_{total2}$. Unlike the first to third embodiments, the downlink data signal transmission power determiner 42 configures a reduction amount $P_{11}-P_{12}$ with respect to the UE 1 for which a low transmission power is used to be smaller than a reduction amount $P_{21}-P_{22}$ with respect to the UE 2 for which a high transmission power is used. Therefore, $P_{11}/P_{21}<P_{12}/P_{22}$ because if the transmission power $P_{12}$ of the data signal directed to the UE 1 in the OFDM symbol in which the common reference signal is arranged is determined with the equation $P_{11}/P_{21}=P_{12}/P_{22}$ maintained, $P_{12}$ becomes too small and there is a risk that the UE 1 would not be able to demodulate the data signal. By configuring the reduction amount $P_{11}-P_{12}$ with respect to the UE 1 for which a low transmission power is used to be smaller than the reduction amount $P_{21}-P_{22}$ with respect to the UE 2 for which a high transmission power is used, it is possible to prevent a situation in which $P_{12}$ becomes too small for the UE 1 to demodulate the data signal.

Meanwhile, it is noted that the downlink data signal transmission power determiner 42 may configure the reduction amount $P_{21}-P_{22}$ with respect to the UE 2 for which a high transmission power is used to be smaller than the reduction amount $P_{11}-P_{12}$ with respect to the UE 1 for which a low transmission power is used. The UE 2 for which a high transmission power is used is far from the base station 10, and there is thus a risk that the UE 2 would not be able to demodulate the data signal if $P_{22}$ is noticeably reduced. By configuring the reduction amount $P_{21}-P_{22}$ with respect to the UE 2 for which a high transmission power is used to be smaller than the reduction amount $P_{11}-P_{12}$ with respect to the UE 1 for which a low transmission power is used, it is possible to prevent a situation in which $P_{22}$ becomes too small for the UE 2 to demodulate the data signal.

Either way, the fourth embodiment is a modification of the first, second or third embodiment. The configurations of the base station 10 and the UEs may be the same as those of the first embodiment.

Next, a detailed explanation will be given of the information elements that are transmitted from the information notifier 40 of the base station 10 to each UE connected to the base station 10 to enable the UE to calculate downlink data signal transmission powers. In a modification of the first embodiment, the information elements include the following.

An information element indicating the number K of UEs multiplexed in NOMA (the number of UEs that use the same frequency simultaneously).

An information element indicating the transmission power $P_{RS}$ of the common reference signal.

An information element indicating a ratio between downlink data signal transmission powers directed to the UEs in an OFDM symbol in which the reference signal is not arranged.

For example, where K=2, the ratio $P_{diff}=P_{11}/P_{21}$ (see FIG. 7). It is noted that the ratio $P_{diff}$ may be its own inverse number or may be represented by dB.

An information element indicating a ratio between downlink data signal transmission powers directed to the UEs in an OFDM symbol in which the reference signal is arranged.

For example, where K=2, the ratio $P_{diff2}=P_{12}/P_{22}$ (see FIG. 7). It is noted that the ratio $P_{diff2}$ may be its own inverse number or may be represented by dB.

An information element indicating the ratio $P_x$ between the transmission power for the common reference signal and the sum of downlink data signal transmission powers for data signals directed to the UEs in the OFDM symbol in which the reference signal is not arranged.

Here, $P_x=P_{RS}/P_{total1}$ see FIG. 7). It is noted that the ratio $P_x$ may be its own inverse number or may be represented by dB.

An information element indicating a ratio $P_y$ between the transmission power for the common reference signal and the sum of downlink data signal transmission powers for data signals directed to the UEs in an OFDM symbol in which the reference signal is arranged.

Here, $P_y=P_{RS}/P_{total2}$ see FIG. 7). It is noted that the ratio $P_y$ may be its own inverse number or may be represented by dB.

An information element indicating the rank of the UE in NOMA.

The power recognizer 62 of each UE calculates, from $P_{RS}$ and $P_x$, the sum $P_{total1}$ of the downlink data signal transmission powers in the OFDM symbol in which the reference signal is not arranged. The power recognizer 62 of each UE also calculates, from $P_{RS}$ and $P_y$, the sum $P_{total2}$ of the downlink data signal transmission powers in the OFDM symbol in which the reference signal is arranged.

Furthermore, where K=2, the power recognizer 62 of each UE calculates, from the $P_{diff}$ and $P_{total1}$, the downlink data signal transmission powers $P_{11}$ and $P_{21}$ in the OFDM symbol in which the reference signal is not arranged. The power recognizer 62 of each UE also calculates, from $P_{diff2}$ and $P_{total2}$, the downlink data signal transmission powers $P_{12}$ and $P_{22}$ in the OFDM symbol in which the reference signal is arranged. The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power.

In a modification of the second embodiment, the information elements that are transmitted to each UE to enable the UE to calculate downlink data signal transmission powers include the following.

An information element indicating the number K of UEs multiplexed in NOMA (the number of UEs that use the same frequency simultaneously).

An information element indicating the transmission power $P_{RS}$ of the common reference signal.

An information element indicating a ratio between downlink data signal transmission powers directed to the UEs in an OFDM symbol in which the reference signal is not arranged.

For example, where K=2, the ratio $P_{diff}=P_{11}/P_{21}$ (see FIG. 7). It is noted that the ratio $P_{diff}$ may be its own inverse number or may be represented by dB.

An information element indicating a ratio between downlink data signal transmission powers directed to the UEs in an OFDM symbol in which the reference signal is arranged.

For example, where K=2, the ratio $P_{diff2}=P_{12}/P_{22}$ (see FIG. 7). It is noted that the ratio $P_{diff2}$ may be its own inverse number or may be represented by dB.

An information element indicating a ratio $P_x$ between the transmission power for the common reference signal and the sum of downlink data signal transmission powers for data signals directed to the UEs in the OFDM symbol in which the reference signal is not arranged.

Here, $P_x=P_R/P_{total1}$ see FIG. 7). It is noted that the ratio $P_x$ may be its own inverse number or may be represented by dB.

An information element indicating a ratio $P_z$ between the sum of downlink data signal transmission powers for data signals directed to the UEs in the OFDM symbol in which the reference signal is not arranged and the sum of downlink data signal transmission powers for data signals directed to the UEs in the OFDM symbol in which the reference signal is arranged.

Here, $P_z=P_{total1}/P_{total2}$ see FIG. 7). It is noted that the ratio $P_z$ may be its own inverse number or may be represented by dB.

An information element indicating the rank of the UE in NOMA.

The power recognizer 62 of each UE calculates, from $P_{RS}$ and $P_x$, the sum $P_{total1}$ of the downlink data signal transmission powers in the OFDM symbol in which the reference signal is not arranged. The power recognizer 62 of each UE also calculates, from $P_{total1}$ and $P_z$, the sum $P_{total2}$ of the downlink data signal transmission powers in the OFDM symbol in which the reference signal is arranged.

Furthermore, where K=2, the power recognizer 62 of each UE calculates, from $P_{diff}$ and $P_{total1}$, the downlink data singal transmission powers $P_{11}$ and $P_{21}$ in the OFDM symbol in which the reference signal is not arranged. The power recognizer 62 of each UE also calculates, from $P_{diff2}$ and $P_{total2}$, the downlink data signal transmission powers $P_{12}$ and $P_{22}$ in the OFDM symbol in which the reference signal is arranged. The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power.

In a modification of the third embodiment, the information elements that are transmitted to each UE to enable the UE to calculate downlink data signal transmission powers include the following.

An information element indicating the number K of UEs multiplexed in NOMA (the number of UEs that use the same frequency simultaneously).

An information element indicating the transmission power $P_{RS}$ of the common reference signal.

An information element indicating a ratio between downlink data signal transmission powers directed to the UEs in an OFDM symbol in which the reference signal is not arranged.

For example, where K=2, the ratio $P_{diff}=P_{11}/P_{21}$ (see FIG. 7). It is noted that the ratio $P_{diff}$ may be its own inverse number or may be represented by dB.

An information element indicating a ratio between downlink data signal transmission powers directed to the UEs in an OFDM symbol in which the reference signal is arranged.

For example, where K=2, the ratio $P_{diff2}=P_{12}/P_{22}$ (see FIG. 7). It is noted that the ratio $P_{diff2}$ may be its own inverse number or may be represented by dB.

An information element indicating a ratio $P_y$ between the transmission power for the common reference signal and the sum of downlink data signal transmission powers for data signals directed to the UEs in the OFDM symbol in which the reference signal is arranged.

Here, $P_y=P_{RS}/P_{total2}$ see FIG. 7). It is noted that the ratio $P_y$ may be its own inverse number or may be represented by dB.

An information element indicating a ratio $P_z$ between the sum of downlink data signal transmission powers for data signals directed to the UEs in the OFDM symbol in which the reference signal is not arranged and the sum of downlink data signal transmission powers for data signals directed to the UEs in the OFDM symbol in which the reference signal is arranged.

Here, $P_z=P_{total1}/P_{total2}$ is true (see FIG. 7). It is noted that the ratio $P_z$ may be its own inverse number or may be represented by dB.

An information element indicating the rank of the UE in NOMA.

The power recognizer 62 of each UE calculates, from $P_{RS}$ and $P_y$, the sum $P_{total2}$ of the downlink data signal transmission powers in the OFDM symbol in which the reference signal is arranged. The power recognizer 62 of each UE also calculates, from $P_{total2}$ and $P_z$, the sum $P_{total1}$ of the downlink data signal transmission powers in the OFDM symbol in which the reference signal is not arranged.

Furthermore, where K=2, the power recognizer 62 of each UE calculates, from $P_{diff2}$ and $P_{total1}$, the downlink data signal transmission powers $P_{11}$ and $P_{21}$ in the OFDM symbol in which the reference signal is not arranged. The power recognizer 62 of each UE also calculates, from $P_{diff}$ and $P_{total2}$, the downlink data signal transmission powers $P_{12}$ and $P_{22}$ in the OFDM symbol in which the reference signal is arranged. The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power.

So far, description has been given of the information elements that the base station 10 transmits to UEs and of the detailed operation of the UEs in a case in which the number K of UEs multiplexed in NOMA is two. In a case in which the number of UEs that are multiplexed in NOMA is three or more, the information elements that the base station 10 transmits to the UEs can be adequately changed, such that the power recognizers 62 of the UEs are able to calculate each downlink data signal transmission power.

Fifth Embodiment

Next, a fifth embodiment will be described. In the fifth embodiment, the configurations of the base station 10 and the UEs may be the same as those of the first embodiment.

Figure 8:
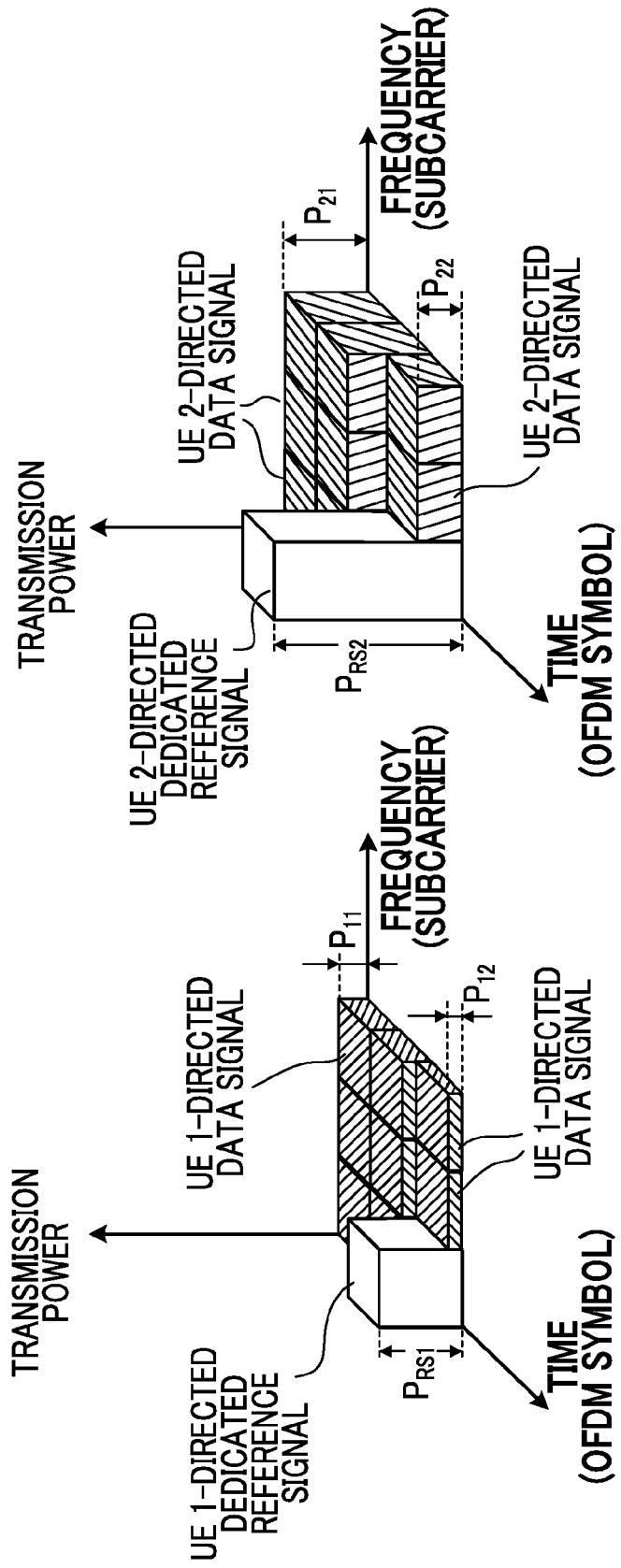
FIG. 8 is a diagram showing a transmission scheme of signals in NOMA according to a fifth embodiment of the present invention.

FIG. 8 is a diagram showing a transmission scheme of signals in NOMA according to a fifth embodiment of the present invention. Here, it is assumed that a UE 1 is located at the center of a cell area, i.e., near the base station 10, and a UE 2 is located at the edge of the cell area, i.e., far from the base station 10. Therefore, a data signal directed to the UE 1 is transmitted from the base station 10 at low transmission power, and a data signal directed to the UE 2 is transmitted from the base station 10 at high transmission power.

In an OFDM symbol in which a reference signal is not arranged, the downlink data signal transmission power determiner 42 determines a transmission power of a data signal directed to the UE 1 to be $P_{11}$ and a transmission power of a data signal directed to the UE 2 to be $P_{21}$, based on CQIs reported from the UEs as described above, according to equation (1) for example.

In an OFDM symbol in which a dedicated reference signal is arranged, on the other hand, the downlink data signal transmission power determiner 42 reduces a downlink data signal transmission power for a data signal directed to each UE to be lower than a downlink data signal transmission power that is for a data signal directed to the UE and is in the OFDM symbol in which a dedicated reference signal is not arranged. More specifically, in the OFDM symbol in which the dedicated reference signal is arranged, the downlink data signal transmission power $P_{12}$ of the data signal directed to the UE 1 is reduced to be lower than the downlink data signal transmission power $P_{11}$ of the data signal directed to the UE 1 in the OFDM symbol in which the reference signal is not arranged. In the OFDM symbol in which the dedicated reference signal is arranged, the downlink data signal transmission power $P_{22}$ of the data signal directed to the UE 2 is reduced to be lower than the downlink data signal transmission power $P_{21}$ of the data signal directed to the UE 2 in the OFDM symbol in which the reference signal is not arranged. For example, the downlink data signal transmission power determiner 42 is able to obtain the downlink data signal transmission powers $P_{12}$ and $P_{22}$ in the OFDM symbol in which the dedicated reference signal is not arranged by multiplying, by a coefficient Y (a positive number less than 1), each of the downlink data signal transmission powers $P_{11}$ and $P_{21}$, respectively, in the OFDM symbol in which the dedicated reference signal is not arranged. Therefore, $P_{11}/P_{21}=P_{12}/P_{22}$. In other words, the ratio of the transmission power for data signals directed to the UE 1 to the transmission power for data signals directed to the UE 2 does not change. The coefficient Y is dependent on the number K of UEs that use the same frequency simultaneously.

In FIG. 8, the dedicated reference signals are DM-RSs for example. The downlink reference signal transmission power determiner 44 determines a transmission power $P_{RS1}$ of the dedicated reference signal directed to the UE 1 to be higher than the downlink data signal transmission power $P_{11}$ of the data signal directed to the UE 1 in an OFDM symbol in which the dedicated reference signal is not arranged. The downlink reference signal transmission power determiner 44 determines a transmission power $P_{RS2}$ of the dedicated reference signal directed to the UE 2 to be higher than the downlink data signal transmission power $P_{21}$ of the data signal directed to the UE 2 in an OFDM symbol in which the dedicated reference signal is not arranged. With the downlink reference signal transmission power being configured to be high, each UE is able to receive the dedicated reference signal with high precision. A ratio of the transmission power $P_{RS1}$ of the dedicated reference signal directed to the UE 1 to the transmission power $P_{RS2}$ of the dedicated reference signal directed to the UE 2 is the same as a ratio of the downlink data signal transmission power directed to the UE 1 to the downlink data signal transmission power directed to the UE 2. In other words, $P_{RS1}/P_{RS2}=P_{11}/P_{21}=P_{12}/P_{22}$ is true.

The reason that a downlink data signal transmission power in an OFDM symbol in which a reference signal is arranged is reduced is that the reference signal cannot be transmitted at high transmission power $P_{RS1}$ or $P_{RS2}$, with the downlink data signal transmission power maintained at the same level as the downlink data signal transmission power in an OFDM symbol in which the reference signal is not arranged, since there is a limit in the transmission power used in the radio signal transmitter 32. In other words, by reducing the downlink data signal transmission power that is for a data signal directed to each UE and is in the OFDM symbol in which a reference signal is arranged to be lower than the downlink data signal transmission power that is for a data signal directed to the UE and is in the OFDM symbol in which the reference signal is not arranged, it is possible to configure the downlink reference signal transmission power to be higher than the downlink data signal transmission power of a data signal in the OFDM symbol in which the reference signal is not arranged. The downlink reference signal transmission power determiner 44 may determine the transmission powers $P_{RS1}$ and $P_{RS2}$ of the dedicated reference signals based on the number K of UEs that use the same frequency simultaneously. Alternatively, the downlink reference signal transmission power determiner 44 may calculate the transmission powers $P_{RS1}$ and $P_{RS2}$ of the dedicated reference signals based on the downlink data signal transmission powers $P_{12}$ and $P_{22}$, which are determined by the downlink data signal transmission power determiner 42, or the total data signal transmission power $P_{total2}$.

Because DM-RSs are used by the UEs to demodulate data signals, the signal processing demodulators 66 of the UEs are able to appropriately demodulate signals with high reception powers (signals directed to other user devices) and appropriately perform interference-cancelling processing. Furthermore, the signal processing demodulators 66 of the UEs are able to appropriately demodulate desired signals with DM-RSs that are of high precision. Accordingly, each UE is able to demodulate the desired signal directed to the UE with high precision.

Next, a detailed explanation will be given of the information elements that are transmitted from the information notifier 40 of the base station 10 to each UE connected to the base station 10 to enable the UE to calculate downlink data signal transmission powers. The information elements include the following.

An information element indicating the number K of UEs multiplexed in NOMA (the number of UEs that use the same frequency simultaneously).

An information element indicating transmission powers of the dedicated reference signals.

For example, where K=2, the information element indicates the transmission power $P_{RS1}$ of the dedicated reference signal directed to the UE 1 and the transmission power $P_{RS2}$ of the dedicated reference signal directed to the UE 2.

An information element indicating a ratio $P_{xI}$ between the transmission power of the dedicated reference signal and a downlink data signal transmission power in an OFDM symbol in which the dedicated reference signal is not arranged.

Here, $P_{xI} = P_{RS1}/P_{11} = P_{RS2}/P_{21}$ (see FIG. 8). It is noted that the ratio $P_{xI}$ may be its own inverse number or may be represented by dB.

An information element indicating a ratio $P_{yI}$ between the transmission power of the dedicated reference signal and a downlink data signal transmission power in an OFDM symbol in which the dedicated reference signal is arranged.

Here, $P_{yI} = P_{RS1}/P_{12} = P_{RS2}/P_{22}$ (see FIG. 8). It is noted that the ratio $P_{yI}$ may be its own inverse number or may be represented by dB.

An information element indicating the rank of the UE in NOMA.

The power recognizer 62 of each UE calculates, from $P_{xI}$ and $P_{RS1}$, the downlink data signal transmission power $P_{11}$ in the OFDM symbol in which the reference signal is not arranged. The power recognizer 62 of each UE also calculates, from $P_{xI}$ and $P_{RS2}$, the downlink data signal transmission power $P_{21}$ in the OFDM symbol in which the reference signal is not arranged. The power recognizer 62 of each UE calculates, from $P_{yI}$ and $P_{RS1}$, the downlink data signal transmission power $P_{12}$ in the OFDM symbol in which the reference signal is arranged. The power recognizer 62 of each UE also calculates, from $P_{yI}$ and $P_{RS2}$, the downlink data signal transmission power $P_{22}$ in the OFDM symbol in which the reference signal is arranged.

The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power. Using these downlink data signal transmission powers, the signal processing demodulator 66 demodulates signals that have undergone multi-level modulation (desired signals and interference signals), taking their constellations into consideration. Accordingly, the UE 1 that receives a desired data signal at low power demodulates the desired data signal using both $P_{11}$ and $P_{21}$ and both $P_{12}$ and $P_{22}$. The UE 2 that receives a desired data signal at high power demodulates the desired data signal using $P_{21}$ and $P_{22}$ alone.

So far, description has been given of the information elements that the base station 10 transmits to UEs and of the detailed operation of the UEs in a case in which the number K of UEs multiplexed in NOMA is two. In a case in which the number of UEs that are multiplexed in NOMA is three or more, the information elements that the base station 10 transmits to the UEs can be adequately changed, such that the power recognizers 62 of the UEs are able to calculate each downlink data signal transmission power.

In this embodiment, the information notifier 40 of the base station 10 notifies each UE of information that enables the UE to calculate the downlink data signal transmission powers of data signals to the UEs in OFDM symbols in which at least dedicated reference signals are arranged. Therefore, in a case in which the downlink data signal transmission powers are reduced in the OFDM symbols in which dedicated reference signals are arranged, the power recognizers 62 of the UEs are able to calculate the downlink data signal transmission power to each UE in the OFDM symbols in which dedicated reference signals are arranged. Using the calculation results, the signal processing demodulators 66 of the UEs are able to perform signal demodulation processing. Moreover, the base station 10 transmits to each UE information elements indicating ratios between transmission powers, and not information indicating the absolute values of the downlink data signal transmission powers, and each UE calculates the absolute values of the downlink data signal transmission powers based on these information elements. It is thus possible to reduce the amount of information that the base station 10 transmits to each UE. Although there are cases in which the transmission powers in the base station 10 are changed, it is not necessary for the base station 10 to transmit to each UE the absolute values of the downlink data signal transmission powers every time the transmission powers in the base station 10 are changed because each UE calculates the absolute values of the downlink data signal transmission powers using the information elements indicating the ratios between the transmission powers.

Furthermore, in this embodiment, the base station 10 notifies each UE of an information element that enables the UE to calculate the downlink data signal transmission powers of data signals to the UEs in OFDM symbols in which dedicated reference signals are not arranged (i.e., the information element indicating the ratio $P_{xI}$ between the transmission power of a dedicated reference signal and the downlink data signal transmission power in an OFDM symbol in which the dedicated reference signal is not arranged). Therefore, it is possible to reduce the amount of information that the base station 10 transmits to each UE. At the same time, the power recognizers 62 of the UEs are able to calculate the downlink data signal transmission power to each UE in an OFDM symbol in which a dedicated reference signal is arranged and calculates the downlink data signal transmission power to each UE in an OFDM symbol in which the dedicated reference signal is not arranged.

Sixth Embodiment

The information elements that are transmitted from the information notifier 40 of the base station 10 to each UE connected to the base station 10 to enable the UE to calculate the downlink data signal transmission powers may also be configured as below. In this case, the configurations of the base station 10 and the UEs may be the same as those of the fifth embodiment.

The information elements include the following.

An information element indicating the number K of UEs multiplexed in NOMA (the number of UEs that use the same frequency simultaneously).

An information element indicating transmission powers of dedicated reference signals.

For example, where K=2, the information element indicates the transmission power $P_{RS1}$ of a dedicated reference signal directed to the UE 1 and the transmission power $P_{RS2}$ of a dedicated reference signal directed to the UE 2.

An information element indicating a ratio $P_{xI}$ between the transmission power of the dedicated reference signal and a downlink data signal transmission power in an OFDM symbol in which the dedicated reference signal is not arranged.

Here, $P_{xI}=P_{RS1}/P_{11}=P_{RS2}/P_{21}$ (see FIG. 8). It is noted that the ratio $P_{xI}$ may be its own inverse number or may be represented by dB.

An information element indicating a ratio $P_{zI}$ between a downlink data signal transmission power in the OFDM symbol in which the dedicated reference signal is not arranged and a downlink data signal transmission power in an OFDM symbol in which the dedicated reference signal is arranged.

Here, $P_{zI}=P_{11}/P_{12}=P_{21}/P_{22}$ (see FIG. 8). It is noted that the ratio $P_{zI}$ may be its own inverse number or may be represented by dB.

An information element indicating the rank of the UE in NOMA.

The power recognizer 62 of each UE calculates, from $P_{xI}$ and $P_{RS1}$, the downlink data signal transmission power $P_{11}$ in the OFDM symbol in which the reference signal is not arranged. The power recognizer 62 of each UE also calculates, from $P_{xI}$ and $P_{RS2}$, the downlink data signal transmission power $P_{21}$ in the OFDM symbol in which the reference signal is not arranged. The power recognizer 62 of each UE calculates, from $P_{zI}$ and $P_{11}$, the downlink data signal transmission power $P_{12}$ in the OFDM symbol in which the reference signal is arranged. The power recognizer 62 of each UE also calculates, from $P_{zI}$ and $P_{21}$, the downlink data signal transmission power $P_{22}$ in the OFDM symbol in which the reference signal is arranged.

The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power. Using these downlink data signal transmission powers, the signal processing demodulator 66 demodulates signals that have undergone multi-level modulation (desired signals and interference signals), taking their constellations into consideration. Accordingly, the UE 1 that receives a desired data signal at low power demodulates the desired data signal using both $P_{11}$ and $P_{21}$ and both $P_{12}$ and $P_{22}$. The UE 2 that receives a desired data signal at high power demodulates the desired data signal using $P_{21}$ and $P_{22}$ alone.

So far, description has been given of the information elements that the base station 10 transmits to UEs and of the detailed operation of the UEs in a case in which the number K of UEs multiplexed in NOMA is two. In a case in which the number of UEs that are multiplexed in NOMA is three or more, the information elements that the base station 10 transmits to the UEs can be adequately changed, such that the power recognizers 62 of the UEs are able to calculate each downlink data signal transmission power.

In this embodiment, the information notifier 40 of the base station 10 notifies each UE of information that enables the UE to calculate the downlink data signal transmission powers of data signals to the UEs in OFDM symbols in which at least dedicated reference signals are arranged. Therefore, in a case in which the downlink data signal transmission powers are reduced in the OFDM symbols in which dedicated reference signals are arranged, the power recognizers 62 of the UEs are able to calculate the downlink data signal transmission power to each UE in the OFDM symbols in which dedicated reference signals are arranged. Using the calculation results, the signal processing demodulators 66 of the UEs are able to perform signal demodulation processing. Moreover, the base station 10 transmits to each UE information elements indicating ratios between transmission powers, and not information indicating the absolute values of the downlink data signal transmission powers, and each UE calculates the absolute values of the downlink data signal transmission powers based on these information elements. It is thus possible to reduce the amount of information that the base station 10 transmits to each UE. Although there are cases in which the transmission powers in the base station 10 are changed, it is not necessary for the base station 10 to transmit to each UE the absolute values of the downlink data signal transmission powers every time the transmission powers in the base station 10 are changed because each UE calculates the absolute values of the downlink data signal transmission powers using the information elements indicating the ratios between the transmission powers.

Furthermore, in this embodiment, the base station 10 notifies each UE of the information elements that enable the UE to calculate the downlink data signal transmission powers of data signals to the UEs in OFDM symbols in which dedicated reference signals are not arranged (i.e., the information element indicating the ratio $P_{xI}$ between the transmission power of the dedicated reference signal and the downlink data signal transmission power in an OFDM symbol in which the dedicated reference signal is not arranged, and the information element indicating the ratio $P_{zI}$ between the downlink data signal transmission power in the OFDM symbol in which the dedicated reference signal is not arranged and the downlink data signal transmission power in an OFDM symbol in which the dedicated reference signal is arranged). Therefore, it is possible to reduce the amount of information that the base station 10 transmits to each UE. At the same time, the power recognizers 62 of the UEs are able to calculate the downlink data signal transmission power to each UE in an OFDM symbol in which a dedicated reference signal is arranged and calculates the downlink data signal transmission power to each UE in an OFDM symbol in which the dedicated reference signal is not arranged.

Seventh Embodiment

The information elements that are transmitted from the information notifier 40 of the base station 10 to each UE connected to the base station 10 to enable the UE to calculate the downlink data signal transmission powers may also be configured as below. In this case, the configurations of the base station 10 and the UEs may be the same as those of the fifth embodiment.

The information elements include the following.

An information element indicating the number K of UEs multiplexed in NOMA (the number of UEs that use the same frequency simultaneously).

An information element indicating transmission powers of dedicated reference signals.

For example, where K=2, the information element indicates the transmission power $P_{RS1}$ of a dedicated reference signal directed to the UE 1 and the transmission power $P_{RS2}$ of a dedicated reference signal directed to the UE 2.

An information element indicating a ratio $P_{yI}$ between the transmission power of a dedicated reference signal and a downlink data signal transmission power in an OFDM symbol in which the dedicated reference signal is arranged.

Here, $P_{yI}=P_{RS1}/P_{12}=P_{RS2}/P_{22}$ is true (see FIG. 8). It is noted that the ratio $P_{yI}$ may be its own inverse number or may be represented by dB.

An information element indicating a ratio $P_{zI}$ between a downlink data signal transmission power in an OFDM symbol in which the dedicated reference signal is not arranged and a downlink data signal transmission power in the OFDM symbol in which the dedicated reference signal is arranged.

Here, $P_{zI}=P_{11}/P_{12}=P_{21}/P_{22}$ (see FIG. 8). It is noted that the ratio $P_{zI}$ may be its own inverse number or may be represented by dB.

An information element indicating the rank of the UE in NOMA.

The power recognizer 62 of each UE calculates, from $P_{yI}$ and $P_{RS1}$, the downlink data signal transmission power $P_{12}$ in the OFDM symbol in which the reference signal is arranged. The power recognizer 62 of each UE also calculates, from $P_{yI}$ and $P_{RS2}$, the downlink data signal transmission power $P_{22}$ in the OFDM symbol in which the reference signal is arranged. The power recognizer 62 of each UE calculates, from $P_{zI}$ and $P_{12}$, the downlink data signal transmission power $P_{11}$ in the OFDM symbol in which the reference signal is not arranged. The power recognizer 62 of each UE also calculates, from $P_{zI}$ and $P_{21}$, the downlink data signal transmission power $P_{22}$ in the OFDM symbol in which the reference signal is not arranged.

The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power. Using these downlink data signal transmission powers, the signal processing demodulator 66 demodulates signals that have undergone multi-level modulation (desired signals and interference signals), taking their constellations into consideration. Accordingly, the UE 1 that receives a desired data signal at low power demodulates the desired data signal using both $P_{11}$ and $P_{21}$ and both $P_{12}$ and $P_{22}$. The UE 2 that receives a desired data signal at high power demodulates the desired data signal using $P_{21}$ and $P_{22}$ alone.

So far, description has been given of the information elements that the base station 10 transmits to UEs and of the detailed operation of the UEs in a case in which the number K of UEs multiplexed in NOMA is two. In a case in which the number of UEs multiplexed in NOMA is three or more, the information elements that the base station 10 transmits to the UEs can be adequately changed, such that the power recognizers 62 of the UEs are able to calculate each downlink data signal transmission power.

In this embodiment, the information notifier 40 of the base station 10 notifies each UE of information that enables the UE to calculate the downlink data signal transmission powers of data signals to the UEs in OFDM symbols in which at least dedicated reference signals are arranged. Therefore, in a case in which the downlink data signal transmission powers are reduced in the OFDM symbols in which dedicated reference signals are arranged, the power recognizers 62 of the UEs are able to calculate the downlink data signal transmission power to each UE in the OFDM symbols in which dedicated reference signals are arranged. Using the calculation results, the signal processing demodulators 66 of the UEs are able to perform signal demodulation processing. Moreover, the base station 10 transmits to each UE information elements indicating ratios between transmission powers, and not information indicating the absolute values of the downlink data signal transmission powers, and each UE calculates the absolute values of the downlink data signal transmission powers based on these information elements. It is thus possible to reduce the amount of information that the base station 10 transmits to each UE. Although there are cases in which the transmission powers in the base station 10 are changed, it is not necessary for the base station 10 to transmit to each UE the absolute values of the downlink data signal transmission powers every time the transmission powers in the base station 10 are changed because each UE calculates the absolute values of the downlink data signal transmission powers using the information elements indicating the ratios between the transmission powers.

Furthermore, in this embodiment, the base station 10 notifies each UE of an information element that enables the UE to calculate the downlink data signal transmission powers of data signals to the UEs in OFDM symbols in which dedicated reference signals are not arranged (i.e., the information element indicating the ratio $P_{zI}$ between the downlink data signal transmission power in an OFDM symbol in which a dedicated reference signal is not arranged and the downlink data signal transmission power in an OFDM symbol in which the dedicated reference signal is arranged). Therefore, it is possible to reduce the amount of information that the base station 10 transmits to each UE. At the same time, the power recognizers 62 of the UEs are able to calculate the downlink data signal transmission power to each UE in an OFDM symbol in which a dedicated reference signal is arranged and calculates the downlink data signal transmission power to each UE in an OFDM symbol in which the dedicated reference signal is not arranged.

Eighth Embodiment

In the fifth to seventh embodiments, the ratio between the transmission power for data signals directed to a particular UE and the transmission power for data signals directed to another UE does not change, between OFDM symbols in which dedicated reference signals are not arranged and OFDM symbols in which dedicated reference signals are arranged. That is, $P_{11}/P_{21}=P_{12}/P_{22}$. However, the downlink data signal transmission power determiner 42 of the base station 10 may make the ratio between downlink data signal transmission powers of data signals directed to user devices in the OFDM symbols in which dedicated reference signals are arranged different from the ratio between downlink data signal transmission powers of data signals directed to the user devices in the OFDM symbols in which the dedicated reference signals are not arranged.

Figure 9:
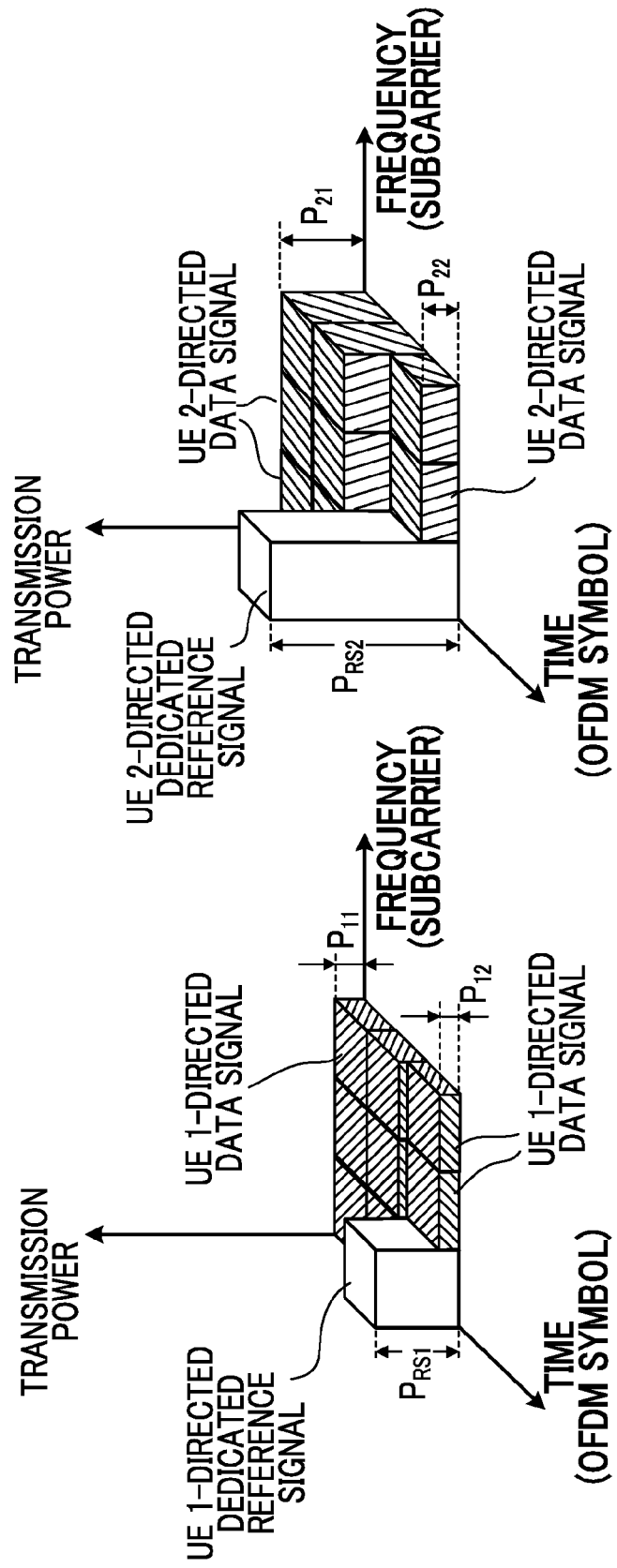
FIG. 9 is a diagram showing a transmission scheme of signals in NOMA according to an eighth embodiment of the present invention.

FIG. 9 is a diagram showing a transmission scheme of signals in NOMA according to an eighth embodiment of the present invention. Here, it is assumed that a UE 1 is located at the center of a cell area, i.e., near the base station 10, and a UE 2 is located at the edge of the cell area, i.e., far from the base station 10. Therefore, a data signal directed to the UE 1 is transmitted from the base station 10 at low transmission power, and a data signal directed to the UE 2 is transmitted from the base station 10 at high transmission power.

In an OFDM symbol in which a reference signal is not arranged, the downlink data signal transmission power determiner 42 determines a transmission power of a data signal directed to the UE 1 to be $P_{11}$ and a transmission power of a data signal directed to the UE 2 to be $P_{21}$, based on CQIs reported from the UEs as described above, according to equation (1) for example.

In an OFDM symbol in which a dedicated reference signal is arranged, on the other hand, the downlink data signal transmission power determiner 42 reduces a downlink data signal transmission power that is for a data signal directed to each UE to be lower than a downlink data signal transmission power that is for a data signal directed to the UE and is in the OFDM symbol in which the dedicated reference signal is not arranged. More specifically, in the OFDM symbol in which the dedicated reference signal is arranged, the downlink data signal transmission power $P_{12}$ of the data signal directed to the UE 1 is reduced to be lower than the downlink data signal transmission power $P_{11}$ of the data signal directed to the UE 1 in the OFDM symbol in which the reference signal is not arranged. In the OFDM symbol in which the dedicated reference signal is arranged, the downlink data signal transmission power $P_{22}$ of the data signal directed to the UE 2 is reduced to be lower than the downlink data signal transmission power $P_{21}$ of the data signal directed to the UE 2 in the OFDM symbol in which the reference signal is not arranged. Unlike the fifth to seventh embodiments, the downlink data signal transmission power determiner 42 configures a reduction amount $P_{11}-P_{12}$ with respect to the UE 1 for which a low transmission power is used to be smaller than a reduction amount $P_{21}-P_{22}$ with respect to the UE 2 for which a high transmission power is used. Therefore, $P_{11}/P_{21}<P_{12}/P_{22}$ because if the transmission power $P_{12}$ of the data signal directed to the UE 1 in the OFDM symbol in which the dedicated reference signal is arranged is determined with the equation $P_{11}/P_{21}=P_{12}/P_{22}$ maintained, $P_{12}$ becomes too small and there is a risk that the UE 1 would not be able to demodulate the data signal. By configuring the reduction amount $P_{11}-P_{12}$ with respect to the UE 1 for which a low transmission power is used to be smaller than the reduction amount $P_{21}-P_{22}$ with respect to the UE 2 for which a high transmission power is used, it is possible to prevent a situation in which $P_{12}$ becomes too small for the UE 1 to demodulate the data signal.

Meanwhile, it is noted that the downlink data signal transmission power determiner 42 may configure the reduction amount $P_{21}-P_{22}$ with respect to the UE 2 for which a high transmission power is used to be smaller than the reduction amount $P_{11}-P_{12}$ with respect to the UE 1 for which a low transmission power is used. The UE 2 for which a high transmission power is used is far from the base station 10, and there is thus a risk that the UE 2 would not be able to demodulate the data signal if $P_{22}$ is noticeably reduced. By configuring the reduction amount $P_{21}-P_{22}$ with respect to the UE 2 for which a high transmission power is used to be smaller than the reduction amount $P_{11}-P_{12}$ with respect to the UE 1 for which a low transmission power is used, it is possible to prevent a situation in which $P_{22}$ becomes too small for the UE 2 to demodulate the data signal.

Either way, the eighth embodiment is a modification of the fifth, sixth, or seventh embodiment. The configurations of the base station 10 and the UEs may be the same as those of the fifth embodiment.

Next, a detailed explanation will be given of the information elements that are transmitted from the information notifier 40 of the base station 10 to each UE connected to the base station 10 to enable the UE to calculate downlink data signal transmission powers. In a modification of the fifth embodiment, the information elements include the following.

An information element indicating the number K of UEs multiplexed in NOMA (the number of UEs that use the same frequency simultaneously).

An information element indicating transmission powers of the dedicated reference signals.

For example, where K=2, the information element indicates the transmission power $P_{RS1}$ of the dedicated reference signal directed to the UE 1 and the transmission power $P_{RS2}$ of the dedicated reference signal directed to the UE 2.

An information element indicating a ratio $P_{xI}$ between the transmission power of the dedicated reference signal and a downlink data signal transmission power in an OFDM symbol in which the dedicated reference signal is not arranged.

Here, $P_{xI}=P_{RS1}/P_{11}=P_{RS2}/P_{21}$ (see FIG. 9). It is noted that the ratio $P_{xI}$ may be its own inverse number or may be represented by dB.

An information element indicating, with respect to each UE, a ratio between the transmission power of the dedicated reference signal and a downlink data signal transmission power in an OFDM symbol in which the dedicated reference signal is arranged.

For example, where K=2, the information element indicates $P_{yI1}$ and $P_{yI2}$.

$$P_{yI1}=P_{RS1}/P_{12} \text{ (see FIG. 9)}$$

$$P_{yI2}=P_{RS2}/P_{22} \text{ (see FIG. 9)}$$

$$P_{yI1} \neq P_{yI2}$$

It is noted that $P_{yI1}$ and $P_{yI2}$ may be their own inverse numbers or may be represented by dB.

An information element indicating the rank of the UE in NOMA.

The power recognizer 62 of each UE calculates, from $P_{xI}$ and $P_{RS1}$, the downlink data signal transmission power $P_{11}$ in the OFDM symbol in which the reference signal is not arranged. The power recognizer 62 of each UE also calculates, from $P_{xI}$ and $P_{RS2}$, the downlink data signal transmission power $P_{21}$ in the OFDM symbol in which the reference signal is not arranged. The power recognizer 62 of each UE calculates, from $P_{yI1}$ and $P_{RS1}$, the downlink data signal transmission power $P_{12}$ in the OFDM symbol in which the reference signal is arranged. The power recognizer 62 of each UE also calculates, from $P_{yI2}$ and $P_{RS2}$, the downlink data signal transmission power $P_{22}$ in the OFDM symbol in which the reference signal is arranged. The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power.

In a modification of the sixth embodiment, the information elements that are transmitted to each UE to enable the UE to calculate downlink data signal transmission powers include the following.

An information element indicating the number K of UEs multiplexed in NOMA (the number of UEs that use the same frequency simultaneously).

An information element indicating transmission powers of the dedicated reference signals.

For example, where K=2, the information element indicates the transmission power $P_{RS1}$ of the dedicated reference signal directed to the UE 1 and the transmission power $P_{RS2}$ of the dedicated reference signal directed to the UE 2.

An information element indicating a ratio $P_{xI}$ between the transmission power of the dedicated reference signal and a downlink data signal transmission power in an OFDM symbol in which the dedicated reference signal is not arranged.

Here, $P_{xI}=P_{RS1}/P_{11}=P_{RS2}/P_{21}$ (see FIG. 9). It is noted that the ratio $P_{xI}$ may be its own inverse number or may be represented by dB.

An information element indicating, with respect to each UE, a ratio between a downlink data signal transmission power in the OFDM symbol in which the dedicated reference signal is not arranged and a downlink data signal transmission power in an OFDM symbol in which the dedicated reference signal is arranged.

For example, where K=2, the information element indicates $P_{zI1}$ and $P_{zI2}$.

$$P_{zI1}=P_{11}/P_{12} \text{ (see FIG. 9)}$$

$$P_{zI2}=P_{21}/P_{22} \text{ (see FIG. 9)}$$

$$P_{zI1} \neq P_{zI2}$$

It is noted that $P_{zI1}$ and $P_{zI2}$ may be their own inverse numbers or may be represented by dB.

An information element indicating the rank of the UE in NOMA.

The power recognizer 62 of each UE calculates, from $P_{xI}$ and $P_{RS1}$, the downlink data signal transmission power $P_{11}$ in the OFDM symbol in which the reference signal is not arranged. The power recognizer 62 of each UE also calculates, from $P_{xI}$ and $P_{RS2}$, the downlink data signal transmission power $P_{21}$ in the OFDM symbol in which the reference signal is not arranged. The power recognizer 62 of each UE calculates, from $P_{zI1}$ and $P_{11}$, the downlink data signal transmission power $P_{12}$ in the OFDM symbol in which the reference signal is arranged. The power recognizer 62 of each UE also calculates, from $P_{zI2}$ and $P_{21}$, the downlink data signal transmission power $P_{22}$ in the OFDM symbol in which the reference signal is arranged. The power recognizer 62 of each UE, based on the rank of the UE in NOMA, recognizes which of $P_{11}$ and $P_{21}$ is either a transmission power of a desired data signal directed to the UE or an interference power, and recognizes which of $P_{12}$ and $P_{22}$ is either a transmission power of a desired data signal directed to the UE or an interference power.

In a modification of the seventh embodiment, the information elements that are transmitted to each UE to enable the UE to calculate downlink data signal transmission powers include the following.

An information element indicating the number K of UEs multiplexed in NOMA (the number of UEs that use the same frequency simultaneously).

An information element indicating transmission powers of the dedicated reference signals.

For example, where K=2, the information element indicates the transmission power $P_{RS1}$ of the dedicated reference signal directed to the UE 1 and the transmission power $P_{RS2}$ of the dedicated reference signal directed to the UE 2.

An information element indicating, with respect to each UE, a ratio between the transmission power of the dedicated reference signal and a downlink data signal transmission power in an OFDM symbol in which the dedicated reference signal is arranged.

For example, where K=2, the information element indicates $P_{yI1}$ and $P_{yI2}$.

$$P_{yI1}=P_{RS1}/P_{12} \text{ (see FIG. 9)}$$

$$P_{yI2}=P_{RS2}/P_{22} \text{ (see FIG. 9)}$$

$$P_{yI1} \neq P_{yI2}$$

It is noted that $P_{yI1}$ and $P_{yI2}$ may be their own inverse numbers or may be represented by dB.

An information element indicating, with respect to each UE, a ratio between a downlink data signal transmission power in an OFDM symbol in which a dedicated reference signal is not arranged and a downlink data signal transmission power in the OFDM symbol in which the dedicated reference signal is arranged.

For example, where K=2, the information element indicates $P_{zI1}$ and $P_{zI2}$.

$$P_{zI1}=P_{11}/P_{12} \text{ (see FIG. 9)}$$

$$P_{zI2}=P_{21}/P_{22} \text{ (see FIG. 9)}$$

$$P_{zI1} \neq P_{zI2}$$

It is noted that $P_{zI1}$ and $P_{zI2}$ may be their inverse numbers or may be represented by dB.

An information element indicating the rank of the UE in NOMA.

The power recognizer 62 of each UE calculates, from $P_{yI1}$ and $P_{RS1}$, the downlink data signal transmission power $P_{12}$ in the OFDM symbol in which the reference signal is arranged. The power recognizer 62 of each UE also calculates, from $P_{yI2}$ and $P_{RS2}$, the downlink data signal transmission power $P_{22}$ in the OFDM symbol in which the reference signal is arranged. The power recognizer 62 of each UE calculates, from $P_{zI1}$ and $P_{12}$, the downlink data signal transmission power $P_{11}$ in the OFDM symbol in which the reference signal is not arranged. The power recognizer 62 of each UE also calculates, from $P_{z/2}$ and $P_{21}$, the downlink data signal transmission power $P_{22}$ in the OFDM symbol in which the reference signal is not arranged.

So far, description has been given of the information elements that the base station 10 transmits to UEs and of the detailed operation of the UEs in a case in which the number K of UEs multiplexed in NOMA is two. In a case in which the number of UEs multiplexed in NOMA is three or more, the information elements that the base station 10 transmits to the UEs can be adequately changed, such that the power recognizers 62 of the UEs are able to calculate each downlink data signal transmission power.

Scheme for Transmitting Information

In the above embodiments, the information notifier 40 of the base station 10 transmits to each UE connected to the base station 10 various information elements that enable the UE to calculate downlink data signal transmission powers of data signals directed to UEs that are multiplexed in NOMA. As already mentioned, NOMA is not applied to UEs that do not have an interference cancellation function. With a UE that has an interference cancellation function that supports NOMA transmitting to the base station 10 information indicating its capability, the base station 10 is able to judge whether or not the UE has such interference cancellation function. The information notifier 40 is able to transmit information elements to, among UEs connected to the base station 10, those UEs that have the function of interference cancellation and that are adapted to NOMA.

The above information elements include information elements indicating ratios between transmission powers (for example, $P_{diff}$, $P_x$, $P_y$, $P_z$, $P_{diff2}$, $P_{xI}$, $P_{yI}$, and $P_{zI}$). The base station 10 and the UEs may store a set including values (a limited number of values) indicating discrete ratios between transmission powers. For example, the set may include 8 values: −6 dB, −4.77 dB, −3 dB, −1.77 dB, 0 dB, 1 dB, 2 dB, and 3 dB. An index number is assigned to each of the values in the set. For example, an index number 1 is assigned to −6 dB, and an index number 2 is assigned to −4.77 dB. The downlink data signal transmission power determiner 42 of the base station 10 calculates $P_{11}$, $P_{21}$, $P_{12}$, $P_{22}$, etc., such that a ratio between transmission powers accord with any one of the values in the set. The information notifier 40 of the base station 10 transmits to the UEs an information element indicating an index number that corresponds to the value currently in use, as the information element indicating a ratio between transmission powers. The power recognizer 62 of a UE recognizes the ratio between the transmission powers according to the index number. For example, if the index number is 2, the ratio between the transmission powers is −4.77 dB. In other words, the information notifier 40 transmits to the UEs an information element indicating an index number that corresponds to the ratio currently in use by the base station 10, as the information element indicating the ratio between transmission powers.

Instead of an index number being assigned to each of the values in the set, the information notifier 40 of the base station 10 may transmit to the UEs, as the information element indicating the ratio between transmission powers, an information element indicating the difference between the ratio between the transmission powers currently used by the base station 10 and the ratio between the transmission powers most recently used by the base station 10 (i.e., information element indicating the level of increase or decrease from the ratio most recently used to the ratio currently in use). For example, in a case in which −6 dB has been used most recently, if the information notifier 40 transmits to the UEs an information element indicating a two-level increase, the power recognizers 62 of the UEs are able to recognize that the ratio between transmission powers is now −3 dB.

By transmitting index numbers of the ratios or the differences in the ratios to each UE, it is possible for the base station 10 to considerably reduce the amount of information to transmit to each UE. In the abovementioned embodiments, the base station 10 transmits, to each UE, various ratios between transmission powers (for example, $P_{diff}$, $P_x$, $P_y$, $P_z$, $P_{diff2}$, $P_{xI}$, $P_{yI}$, and $P_{zI}$). The information notifier 40 of the base station 10 may, with respect to a part of the ratios between powers, transmit information elements indicating index numbers of the ratios or the differences in ratios. Alternatively, the information notifier 40 of the base station 10 may, with respect to all of the ratios of powers, transmit information elements indicating index numbers of the ratios or the differences in ratios.

Any of the following is possible as a specific method for transmitting information elements.

(1) Semi-Static Signaling

The information notifier 40 may transmit information elements to UEs in a long cycle (for example, several hundred milliseconds). In this case, the information notifier 40 may put the information elements in downlink data signals. For example, it is possible to put the information elements in a System Information Block (SIB) mentioned in subchapter 5.2 of 3GPP TS 36.331 V11.0.0. Alternatively, for example, the information notifier 40 may transmit, as broadcast information, the information elements to all UEs connected to the base station 10 and adapted to NOMA, or the information notifier 40 may transmit, using a Radio Resource Control (RRC) signaling, the information elements to all UEs connected to the base station 10 and adapted to NOMA. Alternatively, using an RRC signaling, the information notifier 40 may individually transmit, to each UE connected to the base station 10 and adapted to NOMA, information elements concerning the UE.

(2) Dynamic Signaling

The information notifier 40 may transmit information elements to UEs in a short cycle (for example, several milliseconds). In this case, the information notifier 40 may transmit the information elements to the UEs using a resource of a control signal. For example, a new kind of Downlink Control Information (DCI) mentioned in subchapter 5.3.3 of 3GPP TS 36.212 V12.0.0 may be added, and the information notifier 40 may transmit the information elements to the UEs using the added DCI. Alternatively, the information notifier 40 may use a part of the bits in an existing DCI for transmitting information elements. For example, bits representing the number of layers, the bits being either in DCI Format 2C mentioned in subchapter 5.3.3.1.5C of 3GPP TS 36.212 V12.0.0 or in DCI Format 2D mentioned in subchapter 5.3.3.1.5D of 3GPP TS 36.212 V12.0.0, may be changed such that the bits represent the information elements instead of the number of layers. For example, when eight-layer transmission is intrinsically possible, by limiting the number of layers to four, it is possible to use a part of the bits representing the number of layers for other purposes.

The information elements may be transmitted individually or simultaneously. Furthermore, all of the information elements may be transmitted by either of the above method (1) or (2), or some information elements may be transmitted by method (1) and the other information elements may be transmitted by method (2). It is also possible to transmit some of the information elements by other methods. For example, subchapter 6.3.2 of TS 36.331 V11.0.0 stipulates that an information element indicating the transmission power $P_{RS}$ of a common reference signal should be transmitted as a referenceSignalPower, which is a part of a PDSCH-Config information element. The information element indicating the transmission power $P_{RS}$ may be transmitted as a referenceSignalPower.

Other Modifications

Each of the functions executed by the CPU in the base station 10 and the UEs may instead be executed by hardware or by a programmable logic device such as a Field Programmable Gate Array (FPGA) or a Digital Signal Processor (DSP).

The abovementioned embodiments and modifications may be combined with each other so long as they do not conflict with each other. For example, any of the first to fourth embodiments and any of the fifth to eighth embodiments may be combined.

DESCRIPTION OF REFERENCE SIGNS

1, 2, 100, 101, 102: UE (user device)
10: base station
1*a*: cell area
30: controller
32: radio signal transmitter
33: transmitting antenna
34: radio signal receiver
35: receiving antenna
36: inter-base-station communicator
38: CQI report processor
40: information notifier
42: downlink data signal transmission power determiner
44: downlink reference signal transmission power determiner
50: controller
52: radio signal transmitter
53: transmitting antenna
54: radio signal receiver
55: receiving antenna
60: reception quality measurer
61: CQI reporter
62: power recognizer
64: channel estimator
66: signal processing demodulator

The invention claimed is:

1. A base station for communicating with user devices, comprising:
   a processor coupled to a memory that: determines, according to reception qualities at user devices that are connected to the base station, downlink data signal transmission powers that are different from each other and are for transmitting downlink data signals directed to the user devices connected to the base station; and
   determines a downlink reference signal transmission power for transmitting a downlink reference signal that is received by the user devices connected to the base station; and
   a radio signal transmitter that temporally continuously transmits OFDM (orthogonal frequency division multiplexing) symbols,
   wherein some of the OFDM symbols include data signals that are not orthogonal to each other, each of the data signals being directed to a corresponding one of the user devices connected to the base station, and the reference signal is arranged in the OFDM symbols temporally intermittently,
   wherein the processor reduces a downlink data signal transmission power that is for a data signal directed to each user device and is in an OFDM symbol in which the reference signal is arranged to be lower than a downlink data signal transmission power that is for a data signal directed to the user device and is in an OFDM symbol in which the reference signal is not arranged, and
   wherein the processor determines the downlink reference signal transmission power to be higher than a downlink data signal transmission power that is for a data signal and is in the OFDM symbol in which the reference signal is not arranged.

2. The base station according to claim 1, further comprising an information notifier that notifies the user devices of information that at least enables each user device to calculate downlink data signal transmission powers that are for data signals directed to the user devices and are in the OFDM symbol in which the reference signal is arranged.

3. The base station according to claim 2,
   wherein the reference signal is a common reference signal to the user devices, and
   wherein the information includes at least:
   an information element that indicates a ratio between the downlink data signal transmission powers for the user devices; and
   an information element that indicates a ratio between the downlink reference signal transmission power and a sum of the downlink data signal transmission powers that are for data signals directed to the user devices and are in the OFDM symbol in which the reference signal is arranged.

4. The base station according to claim 3,
   wherein the information notifier notifies the user devices of information that enables each user device to calculate downlink data signal transmission powers that are for data signals directed to the user devices and are in the OFDM symbol in which the reference signal is not arranged.

5. The base station according to claim 3,
   wherein the ratios that can be used in the base station are stored in the base station as a set of discrete values, and
   wherein at least one of the information elements that indicate the ratio indicates an index number corresponding to a ratio that is currently used in the base station.

6. The base station according to claim 3,
   wherein the ratios that can be used in the base station are stored in the base station as a set of discrete values, and
   wherein at least one of the information elements that indicate the ratios indicates a difference between a ratio that is currently used in the base station and a ratio that was most recently used in the base station.

7. The base station according to claim 3,
   wherein the processor makes a ratio between downlink data signal transmission powers that are for data signals directed to the user devices and are in the OFDM symbol in which the reference signal is arranged different from a ratio between downlink data signal transmission powers that are for data signals directed to the user devices and are in the OFDM symbol in which the reference signal is not arranged.

8. The base station according to claim 2,
wherein the reference signal is a common reference signal to the user devices, and
wherein the information includes at least:
an information element that indicates a ratio between the downlink data signal transmission powers for the user devices;
an information element that indicates a ratio between the downlink reference signal transmission power and a sum of downlink data signal transmission powers that are for data signals directed to the user devices and are in the OFDM symbol in which the reference signal is not arranged; and
an information element that indicates a ratio between the sum of the downlink data signal transmission powers that are for data signals directed to the user devices and are in the OFDM symbol in which the reference signal is not arranged and a sum of the downlink data signal transmission powers that are for data signals directed to the user devices and are in the OFDM symbol in which the reference signal is arranged.

9. The base station according to claim 8,
wherein the information notifier notifies the user devices of information that enables each user device to calculate downlink data signal transmission powers that are for data signals directed to the user devices and are in the OFDM symbol in which the reference signal is not arranged.

10. The base station according to claim 8,
wherein the ratios that can be used in the base station are stored in the base station as a set of discrete values, and
wherein at least one of the information elements that indicate the ratio indicates an index number corresponding to a ratio that is currently used in the base station.

11. The base station according to claim 8,
wherein the ratios that can be used in the base station are stored in the base station as a set of discrete values, and
wherein at least one of the information elements that indicate the ratios indicates a difference between a ratio that is currently used in the base station and a ratio that was most recently used in the base station.

12. The base station according to claim 8,
wherein the processor makes a ratio between downlink data signal transmission powers that are for data signals directed to the user devices and are in the OFDM symbol in which the reference signal is arranged different from a ratio between downlink data signal transmission powers that are for data signals directed to the user devices and are in the OFDM symbol in which the reference signal is not arranged.

13. The base station according to claim 2,
wherein the reference signal includes dedicated reference signals for different user devices,
wherein the processor determines a downlink reference signal transmission power for each dedicated reference signal to be higher than a downlink data signal transmission power that is for a data signal directed to the user device corresponding to the dedicated reference signal and is in the OFDM symbol in which the reference signal is not arranged, and
wherein the information includes at least an information element that indicates a ratio between a downlink reference signal transmission power and a downlink data signal transmission power of a data signal in an OFDM symbol in which at least one of the dedicated reference signals is arranged.

14. The base station according to claim 2,
wherein the reference signal includes dedicated reference signals for different user devices,
wherein the processor determines a downlink reference signal transmission power for each dedicated reference signal to be higher than a downlink data signal transmission power that is for a data signal directed to the user device corresponding to the dedicated reference signal and is in the OFDM symbol in which the reference signal is not arranged, and
wherein the information includes at least:
an information element that indicates a ratio between a downlink reference signal transmission power and a downlink data signal transmission power of a data signal in an OFDM symbol in which none of the dedicated reference signals is arranged; and
an information element that indicates a ratio between a downlink data signal transmission power of a data signal in an OFDM symbol in which at least one of the dedicated reference signal is arranged and the downlink data signal transmission power of a data signal in the OFDM symbol in which none of the dedicated reference signals is arranged.

* * * * *